(12) United States Patent
Kumar et al.

(10) Patent No.: US 11,742,756 B2
(45) Date of Patent: Aug. 29, 2023

(54) HYBRID BI-DIRECTIONAL DC-DC POWER CONVERTER AND METHODS OF OPERATION THEREOF

(71) Applicant: SILICONCH SYSTEMS PVT LTD, Karnataka (IN)

(72) Inventors: Kaustubh Kumar, Uttar Pradesh (IN); Burle Naga Satyanarayana, Andhra Pradesh (IN); Rakesh Kumar Polasa, Karnataka (IN); Satish Anand Verkila, Karnataka (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 102 days.

(21) Appl. No.: 17/578,280

(22) Filed: Jan. 18, 2022

(65) Prior Publication Data

US 2023/0013025 A1    Jan. 19, 2023

(30) Foreign Application Priority Data

Jul. 9, 2021   (IN) .............................. 202141030942

(51) Int. Cl.
*H02M 3/07* (2006.01)
*H02M 3/158* (2006.01)
(Continued)

(52) U.S. Cl.
CPC .............. *H02M 3/158* (2013.01); *H02J 7/02* (2013.01); *H02M 1/007* (2021.05); *H02M 3/07* (2013.01); *H02J 2207/20* (2020.01); *H02M 3/073* (2013.01)

(58) Field of Classification Search
CPC ............ H02M 3/07–073; H02M 1/007; H02J 2207/20
See application file for complete search history.

(56) References Cited

U.S. PATENT DOCUMENTS

| 9,143,054 B2 * | 9/2015 | Kuwahara | ............. H02M 7/483 |
| 10,404,175 B2 * | 9/2019 | Chakraborty | ......... H02M 3/158 |

(Continued)

FOREIGN PATENT DOCUMENTS

| CA | 3056408 A1 * | 3/2020 | ............ H02M 1/083 |
| CN | 112953201 A * | 6/2021 | ............... H02M 3/07 |
| EP | 4075635 A1 * | 10/2022 | ............ H02J 7/0013 |

OTHER PUBLICATIONS

Universal Serial Bus Type-C Cable and Connector Specification Release 2.0, USB 3.0 Promoter Group, Aug. 2019 (373 pages).

(Continued)

*Primary Examiner* — Sisay G Tiku
(74) *Attorney, Agent, or Firm* — Procopio, Cory, Hargreaves & Savitch LLP

(57) ABSTRACT

The present disclosure provides a bidirectional hybrid power converter that may include an input circuit consisting of an input power supply and input capacitor, a plurality of switches connected to each other, to input power supply to a set of passive electronic components, to ground and to an output circuit comprising one or more output terminals, each consisting of an output capacitance. The plurality of switches is connected directly or through passive electronic components in an arrangement to obtain a plurality of power converter networks for battery charging as well as other applications by reuse of a set of plurality of switches. The input power supply and the output load are referred to based on the direction of the power conversion flow, forward or reverse. The first terminal can be connected to both a power source as an input and load as an output.

15 Claims, 12 Drawing Sheets

(51) Int. Cl.
*H02M 1/00* (2006.01)
*H02J 7/02* (2016.01)

(56) References Cited

U.S. PATENT DOCUMENTS

| | | | | |
|---|---|---|---|---|
| 10,601,304 | B2* | 3/2020 | McRae | H02M 3/07 |
| 10,644,596 | B2* | 5/2020 | Elserougi | H02M 3/158 |
| 10,651,731 | B1* | 5/2020 | Rainer | H02M 3/1588 |
| 10,903,758 | B2* | 1/2021 | Fu | H02M 7/4837 |
| 11,152,854 | B2* | 10/2021 | Das | H02M 3/285 |
| 11,290,027 | B1* | 3/2022 | Han | H02J 7/02 |
| 11,451,151 | B1* | 9/2022 | Liu | H02M 3/07 |
| 11,522,466 | B1* | 12/2022 | Li | H02M 7/4837 |
| 11,532,987 | B2* | 12/2022 | Han | H02M 1/0058 |
| 11,621,638 | B1* | 4/2023 | Zhang | H02M 3/1584 |
| | | | | 323/271 |
| 2021/0099085 | A1* | 4/2021 | Lau | H02M 3/07 |
| 2021/0359606 | A1* | 11/2021 | Han | H02M 1/0054 |
| 2022/0149644 | A1* | 5/2022 | Liu | H02J 7/0068 |
| 2022/0255433 | A1* | 8/2022 | Wen | H02M 3/158 |
| 2023/0026736 | A1* | 1/2023 | Liu | H02J 50/12 |
| 2023/0089638 | A1* | 3/2023 | Liu | H02M 3/072 |
| | | | | 320/106 |
| 2023/0097692 | A1* | 3/2023 | Liu | H02M 3/072 |
| | | | | 363/60 |

OTHER PUBLICATIONS

Universal Serial Bus Power Delivery Specification, Revision 3.0, Version 2.0, Aug. 29, 2019 (657 pages).

* cited by examiner

HYBRID BI-DIRECTIONAL DC-DC POWER CONVERTER AND METHODS OF OPERATION THEREOF

CROSS REFERENCE TO RELATED APPLICATION(S)

This application claims the benefit of and priority to India Application Serial No. 202141030942, entitled "A HYBRID BI-DIRECTIONAL DC-DC POWER CONVERTER AND METHODS OF OPERATION THEREOF" and filed on Jul. 9, 2021, which is expressly incorporated by reference herein in its entirety.

TECHNICAL FIELD

The present disclosure relates to a DC-DC power converter, and, in particular embodiments, to a bi-directional hybrid power converter.

INTRODUCTION

Introduction includes information that can be useful in understanding the present invention. It is not an admission that any of the information provided herein is prior art or relevant to the presently claimed invention, or that any publication specifically or implicitly referenced is prior art.

Bidirectional dc-dc converters are the devices for the purpose of step-up or step-down of a direct current (DC) voltage level with the capability of power flow in either a forward direction or in a backward direction. With the advent of fast and high-power charging with high DC transmission voltages, step-down (buck) converter topologies with high efficiencies are getting traction in order to provide a lower voltage but higher current at the battery for faster charging. Similar is the case in server-side applications where the DC transmission voltages are as high as 48V or more. In some examples, a Universal Serial Bus (USB) power delivery specification may provide for 240 W of power transfer with a maximum voltage at 48V. In the modern day technology, the same device with a battery can be used to act as a power source in reverse direction and supply to another sink device attached. Hence, the need to perform reverse direction power flow either through step-up (boost) or step-down (buck) are also leading to power converters which can perform bidirectional power transfer. Thus, bidirectional DC-DC converters are getting more and more attention in academic research and industrial and end-consumer portable device applications. Existing bidirectional DC-DC converters work in both buck and boost mode and can manage the flow of power in both the direction between two DC sources and loads by using specific switching scheme.

Existing power converters are available as discrete ICs (Integrated Circuits), where each of them supports a specific power conversion topology. These power conversion topologies could be inductor-based buck/boost/buck-boost or inductor-less switched capacitor converters. To support various power conversion modes and battery charging phases, multiple such ICs may have different power converter topologies/power transfer directions need to be placed on PCB (Printed Circuit Board) which increases PCB footprint and associated bill-of-materials (BoM) cost. For compatibility with legacy power sources, another set of power converter ICs have to be dedicated on the platform. Multiple discrete power converter ICs increase the switching and control complexity, reduce overall system end-to-end power transfer efficiency as more switches are required to interconnect the ICs.

Therefore, there is a need in the art to provide a reliable and efficient bi directional power converter that can overcome the limitations mentioned above by providing a single hybrid power converter which can support all battery charging phases and all varieties of input power supplies including the legacy power sources.

It is an object of the present invention to provide for a single hybrid power converter topology for applications including, but not limited to, battery charging, battery discharging in reverse direction, and providing system supply in portable devices.

It is an object of the present invention to provide for a single hybrid power converter topology that supports multiple operation modes by using optimal number of switches across operational modes: switched capacitor, direct supply short, forward buck, reverse buck, forward boost, reverse boost and the like.

It is an object of the present invention to provide for a single hybrid power converter topology that facilitates appropriate mode selection for all battery charging phases (Trickle charging phase, pre-charge phase, CC (Constant Current phase of battery charging), CV (Constant Voltage phase of battery charging) and the like) and battery discharging It is an object of the present invention to provide for a single hybrid power converter topology that is scalable for any battery cell configuration (1S/2S/etc.)

It is an object of the present invention to provide for a single hybrid power converter topology that supports all varieties of power adapters as input supply such as USB PD (Universal Serial Bus Power Delivery), legacy BC1.2 (Battery Charging 1.2) DCP (Dedicated Charging Port)/CDP (Charging Downstream Port)/SDP (Standard Downstream Port), proprietary fast charging protocols, and the like for battery charging.

BRIEF SUMMARY

The present disclosure relates to a power converter, and, in particular embodiments, to a bi-directional hybrid power converter.

In an aspect, the present disclosure provides a hybrid power converter facilitating bidirectional power conversion. The hybrid power converter may include an input terminal comprising one or more capacitors connected to an input power supply, one or more output terminals, each of the output terminals connected to one or more output capacitors and an output load. The hybrid power converter may further include a first converter network with interleaved phases, and may include at least eight switches, where a first switch and a fifth switch may be connected on a fourth terminal electrically coupled to the first input/output terminal through a reverse-blocking switch for blocking current, when required, from the second input/output terminal connected to battery as power source towards the first input/output terminal connected to a load. A first set of parallel flying capacitors may be connected across a shared node of the first switch and a second switch and a shared node of a third switch and a fourth switch, where a second set of parallel flying capacitors may be connected across a shared node of the fifth switch and a sixth switch and a shared node of a seventh switch and an eighth switch. A shared node of the second switch and a third switch and a shared node of the sixth switch and the seventh switch may be connected to the second output terminal connected to the battery. The hybrid power converter may include a second converter network comprising at least four switches. A series combination of a ninth switch and a tenth switch may be connected from the first input/output terminal to the ground, and a shared node of the ninth switch and the tenth switch may be connected via an inductor to a shared node of the seventh switch and the eighth switch. The second converter network may further include at least four sub-networks, the fourth converter network, the fifth converter network, the sixth converter network and the seventh converter network, wherein reconfiguring any or a combination of the first converter network and the second converter network by switching or turning on plurality of switches may facilitate a plurality of power converter networks.

In addition, the hybrid power converter further may include wherein the input power supply and the output load may be referred based on a direction of the power conversion flow, wherein a first input or a first output terminal may be connected to the input power supply or the output load based on an operational mode and application. A battery to be connected to a second input or a second output terminal may be any or a combination of serial and parallel configuration of one or more connected cells. The battery may be operated in charging mode acting as the load or discharging mode acting as the power source.

In an embodiment, the hybrid power converter further may include at least a third output terminal, connected to an output capacitance, and to the system load and a battery disconnect switch connected between the third output terminal and the second input or the second output terminal, wherein the battery disconnect switch, when switched off, may isolate the battery connected to the second input/output terminal from the system load connected to the third output terminal. A first isolation switch may be added between the sixth and seventh switch, and a shared node of the first isolation switch and the sixth switch may be shorted to a shared node of the second and third switch, and connected to the second input/output terminal connected to the battery. A shared node of the first isolation switch and the seventh switch may be connected to the third output terminal connected to the system load via a second isolation switch.

In an embodiment, the first converter network further may further include a second terminal of the first switch connected to a series combination of the second switch, the third switch and the fourth switch; a second terminal of the fourth switch connected to the ground; a second terminal of the fifth switch connected to a series combination of the sixth switch, the seventh switch and the eighth switch, wherein a second terminal of the eight switch may be connected to the ground; a shared node of the second switch and the third switch may be shorted to a shared node of the sixth switch and the seventh switch.

In an embodiment, the one or more switches are physically implemented as n-channel power MOSFETs, wherein each drain terminal of the first to the tenth switches are connected in the direction of the first input/output terminal and each source terminal of the first to the tenth switches are connected in the direction of the ground, and wherein the first to the tenth switches are capable of switching operation over the desired frequency range.

In an embodiment, the hybrid power converter may further include a first isolation switch implemented as n-channel power MOSFET, the first isolation switch implemented as n-channel power MOSFET has a drain terminal connected to the seventh switch, and a source terminal connected to the sixth switch; a second isolation switch implemented as n-channel power MOSFET, the second isolation switch has a drain terminal connected to a shared node of the first isolation switch and the seventh switch, and a source terminal connected to the third output terminal connected to the system load. A battery disconnect switch may be implemented as n-channel power MOSFET and may act as a true reverse current blocking MOSFET and has a drain terminal connected to the third output terminal connected to the system load, a source terminal connected to the second input/output terminal connected to the battery, and a bulk terminal connected to the drain or the source terminal depending on the direction of the reverse current flow.

In an embodiment, an output node of second converter network towards the second input/output terminal connected to battery may be the same as the output node of the first converter network.

In an aspect, the present disclosure provides a method of power conversion at a predefined switching frequency. The method may include the steps of turning on the reverse-blocking switch, during the entire operation for a hybrid power converter facilitating bidirectional power conversion. The hybrid power converter may include an input terminal comprising one or more capacitors connected to an input power supply, one or more output terminals, each of the output terminals connected to one or more output capacitors and an output load. The hybrid power converter may further include a first converter network with interleaved phases, and may include at least eight switches, where a first switch and a fifth switch may be connected on a fourth terminal electrically coupled to the first input/output terminal through a reverse-blocking switch for blocking current, when required, from the second input/output terminal connected to battery as power source towards the first input/output terminal connected to a load. A first set of parallel flying capacitors may be connected across a shared node of the first switch and a second switch and a shared node of a third switch and a fourth switch, where a second set of parallel flying capacitors may be connected across a shared node of the fifth switch and a sixth switch and a shared node of a seventh switch and an eighth switch. A shared node of the second switch and a third switch and a shared node of the sixth switch and the seventh switch may be connected to the second output terminal connected to the battery. The hybrid power converter may include a second converter network comprising at least four switches. A series combination of a ninth switch and a tenth switch may be connected from the first input/output terminal to the ground, and a shared node of the ninth switch and the tenth switch may be connected via an inductor to a shared node of the seventh switch and the eighth switch. The second converter network may further include at least four sub-networks, the fourth converter network, the fifth converter network, the sixth converter network and the seventh converter network, wherein reconfiguring any or a combination of the first converter network and the second converter network by switching or turning on plurality of switches may facilitate a plurality of power converter networks. The method may further include the step of keeping off the ninth and the tenth switch, during the entire operation; turning on a first set of switches comprising a first, a third, a sixth and an eighth switch for a first half of a switching cycle, while keeping a second set of switches comprising a second, a fourth, a fifth and a seventh switch switched off; and turning on the second set of switches comprising the second, the fourth, the fifth and the seventh switch for a second half of the switching cycle, while keeping the first set of switches comprising the first, the third, the sixth and the eighth switch switched off, wherein a dead time interval may be maintained between the turning-off of one set of switches and turning-on of another set of switches.

In an embodiment, the method may further include the steps of turning on the ninth switch for obtaining a sixth converter network or turning on the seventh switch for obtaining a seventh converter network during the entire operation; turning on the seventh switch for obtaining the sixth converter network or turning on the tenth switch for obtaining the seventh converter network for an on-time duration, while keeping the eighth switch of the sixth converter network or the ninth switch of the seventh converter network switched off; and turning on the eighth switch of the sixth converter network or turning on the ninth switch of the seventh converter network for an off-time duration, while keeping the seventh switch of the sixth converter network or the tenth switch of the seventh converter network switched off, and wherein a dead time interval may be maintained between the turning-off of one set of switches and turning-on of another set of switches, and wherein the reverse-blocking switch, the first, the second, the fifth, the sixth, the third, and the fourth switch for both the sixth and the seventh converter network, the eighth switch for the seventh converter network and the tenth switch for the sixth converter network may be switched off during the entire operation.

In an embodiment, the method may include the step of turning on of a first isolation switch and a battery disconnect switch and turning off of the second isolation switch for any of the first converter network, fourth converter network, the fifth converter network, for power conversion with output associated to the second output terminal connected to the battery, and any of the sixth converter network and the seventh converter network for power conversion with output associated to the first output terminal.

In an embodiment, the method may include the step of turning on of a second isolation switch and a battery disconnect switch and turning off of the first isolation switch for any of the fourth converter network and the fifth converter network comprises power conversion with output associated to the third output terminal connected to the system load.

In an aspect, the method for power conversation at a predefined switching frequency may include the steps of turning on the reverse-blocking switch, the first, the second, the fifth and the sixth switches during the entire operation; and keeping the third, the fourth, the seventh, the eighth, a ninth and a tenth switch switched off during the entire operation to obtain a third converter network.

In another aspect, the method for power conversation at the predefined switching frequency may include the steps of turning on the seventh switch for obtaining a fourth converter network or turning on the ninth switch for obtaining a fifth converter network during the entire operation; turning on the ninth switch for obtaining the fourth converter network or turning on the eighth switch for obtaining the fifth converter network for an on-time duration, while keeping the tenth switch of the fourth converter network or the seventh switch of the fifth converter network switched off; and turning on the tenth switch of the fourth converter network or turning on the seventh switch of the fifth converter network for an off-time duration, while keeping the ninth switch of the fourth converter network or the eighth switch of the fifth converter network switched off, and wherein a dead time interval may be maintained between the turning-off of one set of switches and turning-on of another set of switches, and wherein the reverse-blocking switch, the first, the second, the fifth, the sixth, the third, and the fourth switch for both the fourth and the fifth converter network, the eighth switch for the fourth converter network and the tenth switch for the fifth converter network may be switched off during the entire operation.

In an aspect, the method for power conversation during battery charging phases for charging battery connected to the second output terminal with a first input supply connected to the first input terminal with predetermined specifications my include the steps of: operating any of a fourth converter network or fifth converter network during trickle and pre-charging phases for a pre-defined trickle or pre-charge time, while regulating a constant output voltage at the third output terminal connected to the system load, wherein a resistance of the battery disconnect switch is controlled to regulate a specified trickle and pre-charge current into the second output terminal connected to battery, operating any fourth converter network or converter network during constant current charge (CC) phase, while regulating a constant current drawn at the second output terminal connected to battery, wherein the constant current value is decided based on the battery design capacity, chemistry and temperature, maximum current supported by the first input terminal connected to a power source and the maximum current supported by power converter switches; and operating any fourth converter network or fifth converter network during constant voltage (CV) phase, while regulating a constant output voltage at the second output terminal connected to battery.

In an embodiment, the method for charging the battery connected to second output terminal with a second input supply connected to the first input terminal and predetermined specifications may further include any of the steps of operating first converter network during constant current charge (CC) phase, while negotiating a second input supply and ensuring the second input supply operates in a current limited mode with the average input current half of the total of the constant charging current and/or system load; or alternatively, operating third converter network during constant current (CC) charge phase, while negotiating the second input supply and ensuring the second input supply operates in a current limited mode with the average input current equal to the total of the constant charging current and/or system load.

Various objects, features, aspects, and advantages of the inventive subject matter will become more apparent from the following detailed description of preferred embodiments, along with the accompanying drawing figures in which like numerals represent like components

BRIEF DESCRIPTION OF THE DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

DETAILED DESCRIPTION

The present disclosure relates to a power converter, and, in particular embodiments, to a bi-directional hybrid power converter for battery charging, battery discharging in reverse direction, providing system supply and the like.

Figure 1:
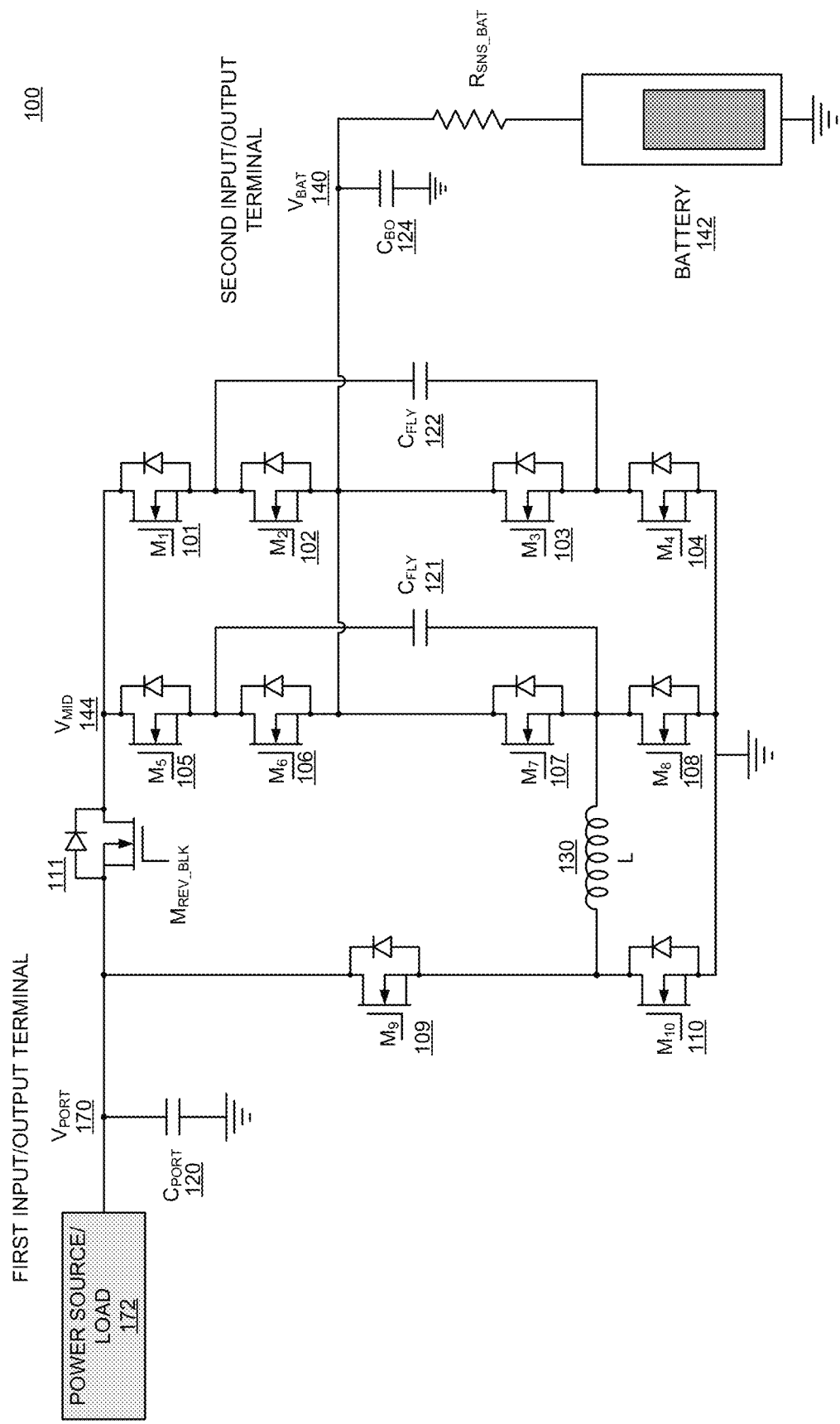
FIG. 1 illustrates an exemplary schematic diagram of the proposed hybrid power converter for only battery charging/discharging, in accordance with an embodiment of the present disclosure.

FIG. 1 illustrates an exemplary schematic diagram of the proposed hybrid power converter for only battery charging/discharging applications, in accordance with an embodiment of the present disclosure.

Figure 2:
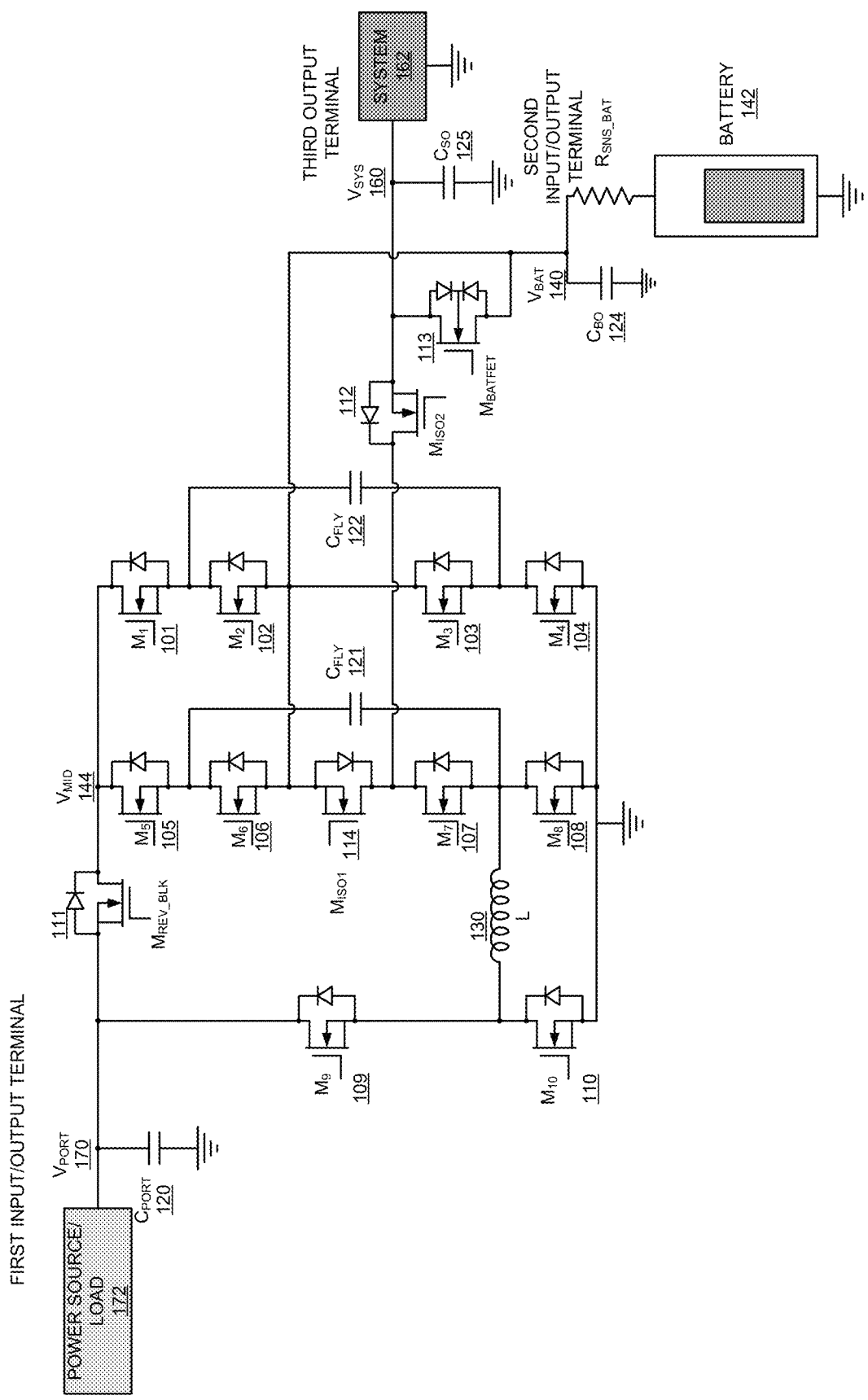
FIG. 2 illustrates an exemplary schematic diagram of the proposed hybrid power converter for battery charging/discharging and accompanying portable device system as the load, in accordance with an embodiment of the present disclosure.

FIG. 2 illustrates an exemplary schematic diagram of the proposed hybrid power converter for battery charging applications with battery and accompanying portable device system as load, in accordance with an embodiment of the present disclosure.

As illustrated, in an aspect, a hybrid power converter 100 (which may also be referred to as a hybrid DC-DC converter 100) is provided that may include an input terminal that is connected to an input power supply and one or more input capacitors, a plurality of switches (101-114). The plurality of switches (101-114) may be connected to each other, the input power supply, or through passive electronic components in an arrangement to obtain a plurality of DC-DC power conversion schemes such as bidirectional buck-boost, switched capacitor converter, direct supply short, etc., but not limited to the like by reuse of a set of switches. The hybrid power converter further includes one or more output circuits that may each include output capacitance and an output load. The input power supply and the output load may be referred to or determined based on the direction of the power conversion flow, e.g., forward or reverse. For example, a first terminal, $V_{PORT}$, (170) can be connected to either a power source as an input or to a load as an output. Similarly, a second terminal, $V_{BAT}$, (140) connected to a battery (142) can act as either a power source input while discharging or a load output while charging. As shown by FIG. 2, if a third terminal, $V_{SYS}$, (160) is presented, it may connect to a system (162) and behave as a load.

In a forward power conversion flow case, the first terminal (170), $V_{PORT}$, is connected to an input power supply (172), the $C_{PORT}$ (120) is the input capacitance connected to the input supply (172), then the hybrid power converter performs power conversion to deliver output power to the second terminal, $V_{BAT}$, (140) connected to the battery (142) and associated output capacitance $C_{BO}$ (124). In above case, the hybrid power converter can also deliver output power to the third terminal, $V_{SYS}$, (160) connected to the portable device SYSTEM load (162) and associated with output capacitance $C_{SO}$ (125). A practical application of above case can be charging a smartphone device, power-bank, notebook, etc. from USB based power adapter.

In a reverse power conversion flow case, the second terminal, $V_{BAT}$, (140) provides the input power supply with battery (142) as the power source, the $C_{BO}$ (124) is associated with input capacitance connected to the second terminal, $V_{BAT}$, (140), then the hybrid power converter performs power conversion to deliver output power to the first terminal, $V_{PORT}$, (170) connected to a load (172). In above case, the battery (142) can also be directly connected to the third terminal, $V_{SYS}$, (160) through battery disconnect switch (113), to provide supply to the portable device system load (162) and the associated output capacitance $C_{SO}$ (125). A practical application of the above case can be using a smartphone device to charge another portable device or for USB OTG (On-The-Go) connection, like flash drives, and the like.

The hybrid power converter switches $M_1$-$M_{10}$ (101-110) are capable of high frequency switching operation and are referred to as the first switch to the tenth switch, in the numbering order. The switch $M_{REV\_BLK}$ (111) is henceforth referred to as the reverse blocking switch, $M_{ISO1}$ (114) as the first isolation switch, $M_{ISO2}$ (112) as the second isolation switch and $M_{BATFET}$ (113) as the battery disconnect switch. The switches 111-114 are intended for static on or off operations and not high frequency switching.

In an embodiment, the switches can be physically implemented as n-channel power MOSFETs. A first switch to an eighth switch (101, 102 . . . 108) may form a first converter network (interchangeably referred to as the switched capacitor converter network) with interleaved phases. The first switch (101) and the fifth switch (105) may be connected, on a fourth terminal $V_{MID}$ (144, electrically coupled to the first terminal $V_{PORT}$ (170) through a reverse-blocking switch (111) for blocking current, when required, from second input/output terminal $V_{BAT}$ (140) connected to battery (142) as power source towards the first input/output terminal $V_{PORT}$ (170) connected to a load (172). In an embodiment, the first switch (101) may be connected, on a second terminal to a series combination of the second switch (102), a third switch (103) and a fourth switch (104) and the second terminal of the fourth switch (104) connected to the ground. The fifth switch (105) may be connected, on the second terminal to a series combination of a sixth switch (106), a seventh switch (107) and an eighth switch (108), all in series, and the second terminal of the eighth switch (108) connected to the ground. A shared node of the second switch (102) and the third switch (103) may be shorted to a shared node of the sixth switch (106) and the seventh switch (107). A first set of parallel flying capacitors (122) may be connected across a shared node of the first switch (101) and the second switch (102) and a shared node of the third switch (103) and the fourth switch (104).

In an embodiment, a second set of parallel flying capacitors (121) may be connected across a shared node of the fifth (105) and the sixth switch (106) and a shared node of the seventh switch (107) and the eighth switch (108). A shared node of the second (102) and the third switch (103) and a shared node of the sixth (106) and the seventh switch (107) may be connected to the output capacitance $C_{BO}$ (123) and the battery (142). A ninth (109) and a tenth switch (110) may be connected in series from the first input/output terminal $V_{PORT}$ (170) to the ground, and a shared node of the ninth (109) and the tenth switch (110) may be connected via an inductor (130) to a shared node of the seventh (107) and the eighth switch (108) to form a second converter network (interchangeably referred to as a H-bridge 4-switch bidirectional buck-boost converter network or simply as H-bridge network) that may include the ninth (109), the tenth (110), the seventh (107) and the eighth switch (108). The output node of the H-bridge network towards the battery (142) may be the same as the output node of the switched capacitor network.

In an embodiment, the first switch (101) to the tenth switch (110) may be capable of switching operation over a desired frequency range.

In an embodiment, if the switches is implemented as n-channel power MOSFETs, the first switch (101) to the tenth switch (110) may have a drain terminal of each switch connected in the direction of the first input/output terminal V$_{PORT}$ (170) and a source terminal of each switch connected in the direction of the ground.

In another embodiment, the reverse-blocking switch (111) if implemented as n-channel power MOSFET, has the drain terminal connected to the drain terminals of the first (101) and the fifth switch (105), and the source terminal connected to the first input/output terminal V$_{PORT}$ (170). The reverse-blocking switch may be turned on in a static fashion to operate the switched capacitor network and may be turned off otherwise, and hence may not require a switching operation.

Figure 3A:
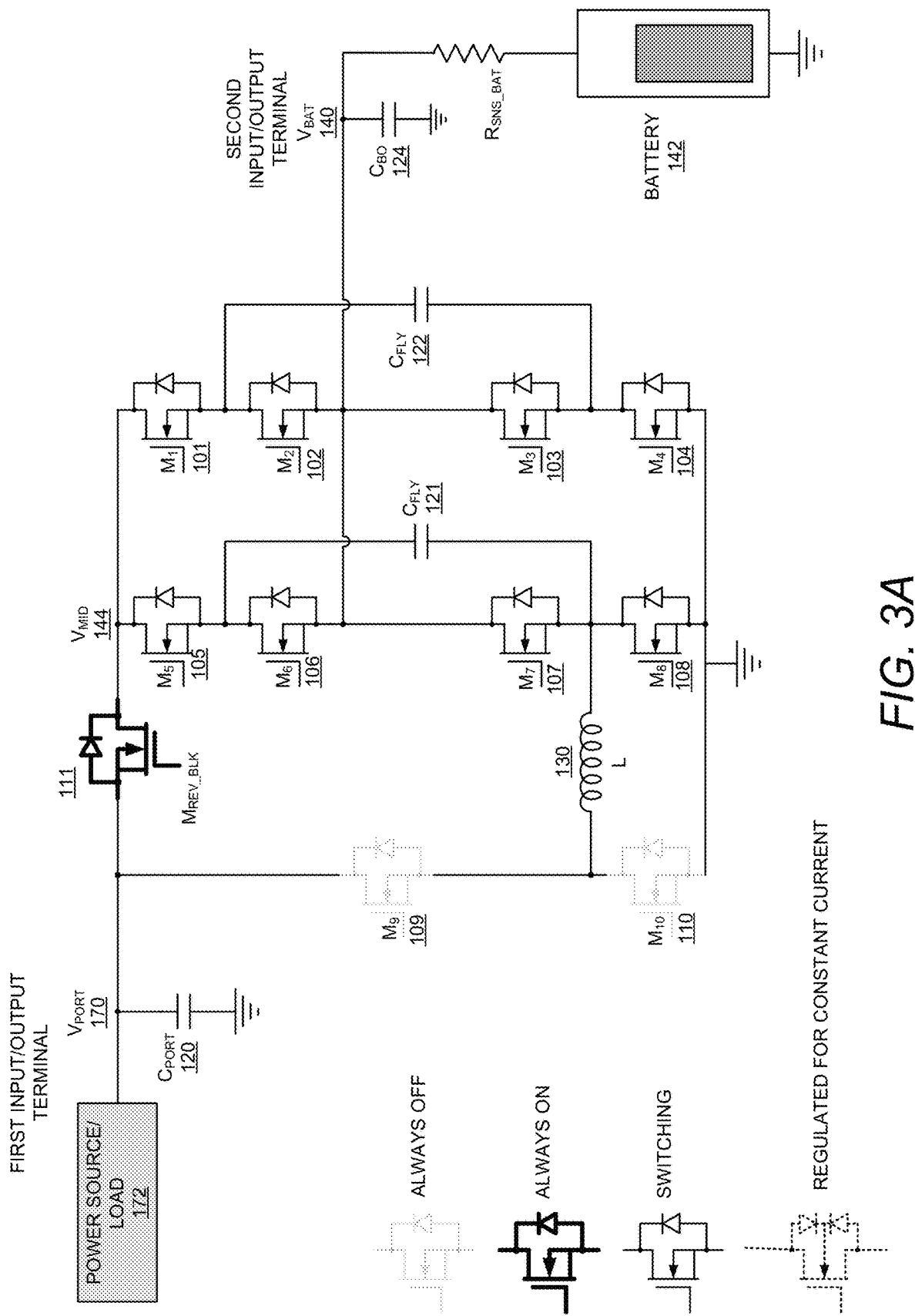
FIGS. 3A-3J illustrate exemplary schematic diagrams of the proposed hybrid power converter for a plurality of different modes of converter network operations, in accordance with various embodiments of the present disclosure.

In an embodiment, the switched capacitor converter (first converter network) operation may be obtained, at a desired switching frequency, as shown in FIG. 3A, by a method that may include the steps of turning on the reverse-blocking switch (111) during the entire operation, turning on the first (101), third (103), sixth (106) and eighth (108) switches for a first half of the switching cycle, while keeping the second (102), fourth (104), fifth (105) and seventh (107) switches switched off, and then turning on the second (102), fourth (104), fifth (105) and seventh (107) switches for the second half of the switching cycle, while keeping the first (101), the third (103), the sixth (106) and the eighth (108) switches switched off. In an embodiment, the first half and the second half of the switching cycle may have a small dead time between turning off a first set of switches and turning on a second set of switches, i.e., a pre-defined dead time between switching cycles. In an exemplary embodiment, a DC voltage generated at the second output terminal V$_{BAT}$ (140) connected to battery (142) is half of the input supply voltage on the first input terminal V$_{PORT}$ (170) and the average current drawn from the input power supply (172) is half of the average current drawn by the load connected to the second output terminal V$_{BAT}$ (140), i.e., the charging current drawn by the battery (142). The ninth switch (109) and the tenth switch (110) may be switched off during the entire operation. The voltage and current relationships at the first input terminal V$_{PORT}$ (170) and the second output terminal V$_{BAT}$ (140) are as mentioned below (Assuming voltage drop in the power path due to switch resistance and other components is negligible):

$$V_{BAT(OUT)} = \frac{V_{PORT(IN)}}{2}$$

$$I_{PORT(IN)} = \frac{I_{BAT(OUT)}}{2}$$

Figure 3B:
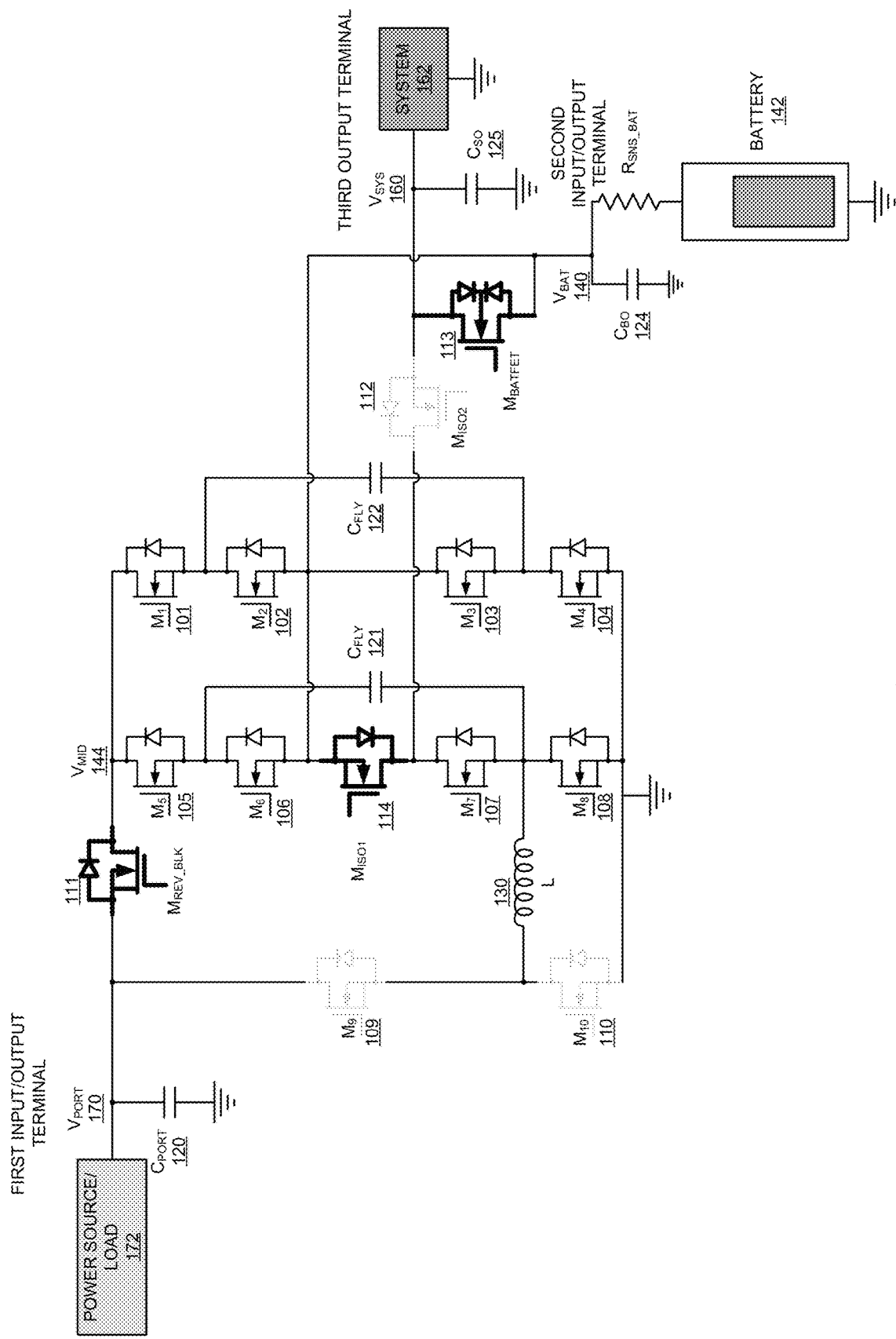

In an embodiment, a third converter network (interchangeably referred to as direct supply short operation) may be obtained (Ref. FIG. 3I) by the method that may include the steps of turning always on the reverse-blocking switch (111), the first (101), the second (102), the fifth (105) and the sixth (106) switches during the entire operation, while keeping the third (103), the fourth (104), the seventh (107), the eighth (108), the ninth (109) and the tenth (110) switches switched off during the entire operation. In an exemplary embodiment, a DC voltage generated at the second output terminal V$_{BAT}$ (140) connected to battery (142) is equal to the input supply voltage on the first input terminal V$_{PORT}$ (170) and the average current drawn from the input power supply (172) is equal to the average current drawn by the load connected to the second output terminal V$_{BAT}$ (140), i.e., the charging current drawn by the battery (142). The voltage and current relationships at the first input terminal V$_{PORT}$ (170) and the second output terminal V$_{BAT}$ (140) are as mentioned below (Assuming voltage drop in the power path due to switch resistance and other components is negligible):

$$V_{BAT(OUT)} = V_{PORT(IN)},$$

$$I_{PORT(IN)} = I_{BAT(OUT)}$$

Figure 3C:
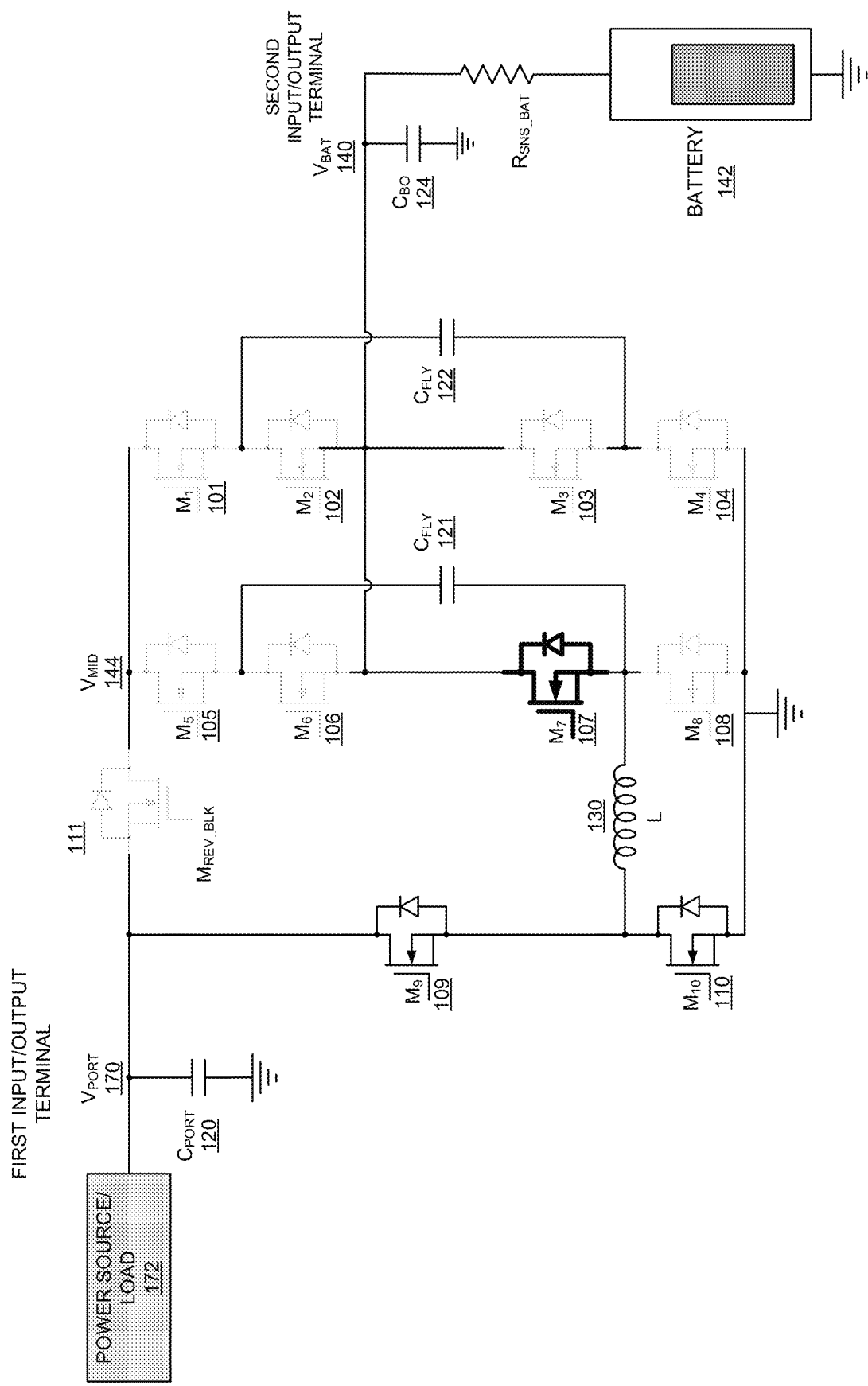
Figure 3D:
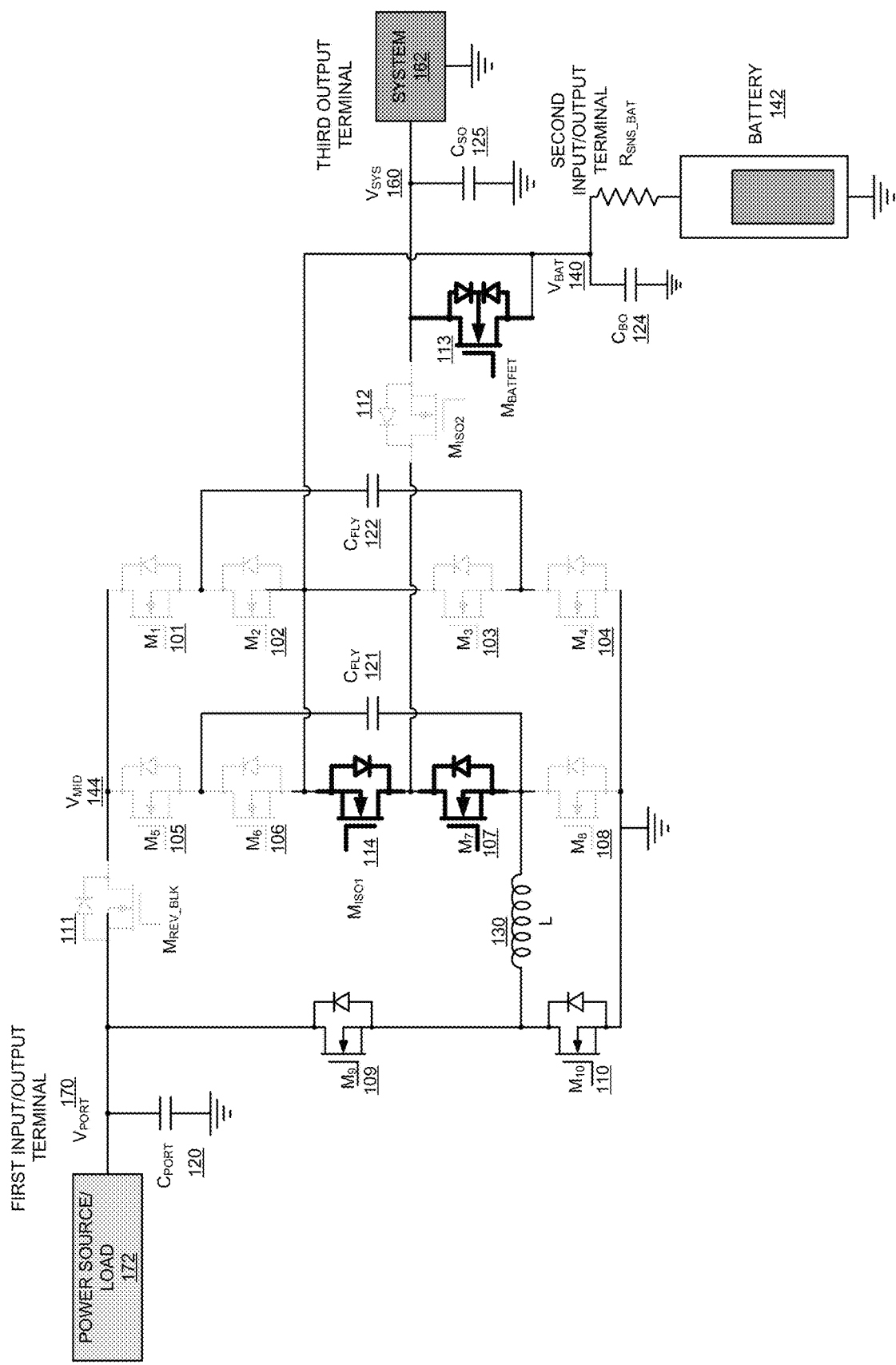

In an embodiment, a fourth converter network (interchangeably referred to as a forward buck converter operation for providing power output to battery (142) from the input power source (172) at the first input terminal V$_{PORT}$ (170)) may be obtained, as shown in FIG. 3C, at the desired switching frequency by the method that may include the steps of turning on the seventh switch (107) during the entire operation, turning on the ninth switch (109) for an on-time duration, while keeping the tenth switch (110) switched off, and then turning on the tenth switch (110) for an off-time duration, while keeping the ninth switch (109) switched off. Both ninth switch (109) and tenth switch (110) are turned off for a predefined dead time while transition between turning on a switch and turning off another switch as like standard synchronous buck topology operation.

In an embodiment, the total of on-time duration and off-time duration is equal to the switching cycle time-period, and the ratio of on-time duration to the switching cycle time-period (also referred to as the first duty cycle, D$_1$) may determine the ratio of voltage at the second output terminal, V$_{BAT}$, (140) to the input power supply voltage at the first input terminal V$_{PORT}$ (170). The reverse-blocking switch (111), the first (101), the second (102), the fourth (104), the fifth (105), the sixth (106), the third (103) and the eighth (108) switches may be switched off during the entire operation. The voltage relationships at the first input terminal V$_{PORT}$ (170) and the second output terminal V$_{BAT}$ (140) are as mentioned below (Assuming voltage drop in the power path due to switch resistance and other components is negligible):

$$\frac{V_{BAT(OUT)}}{V_{PORT(IN)}} = \frac{T_{ON\_M9}}{T_{ON\_M9} + T_{OFF\_M9}} = D_1$$

Figure 3E:
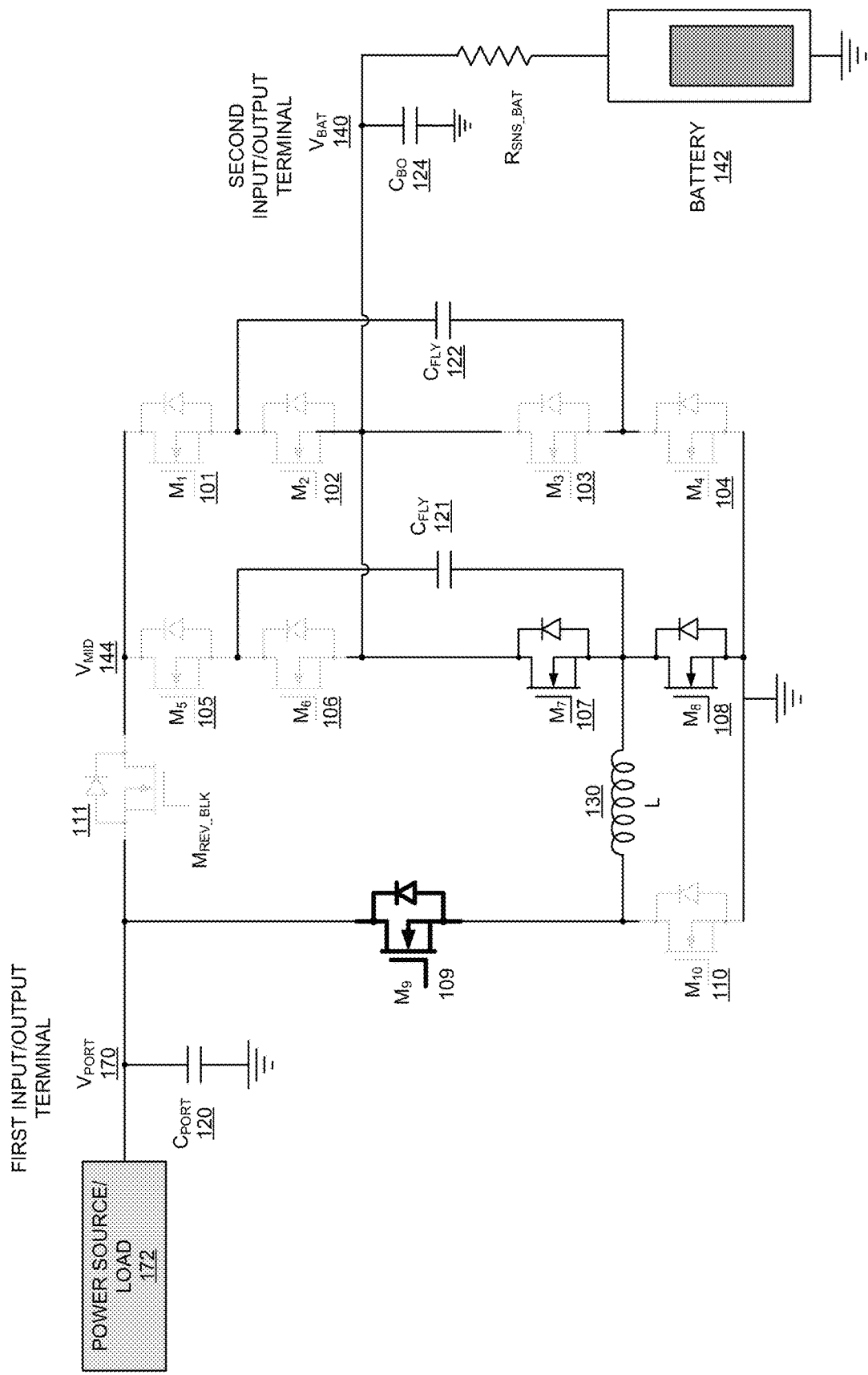
Figure 3F:
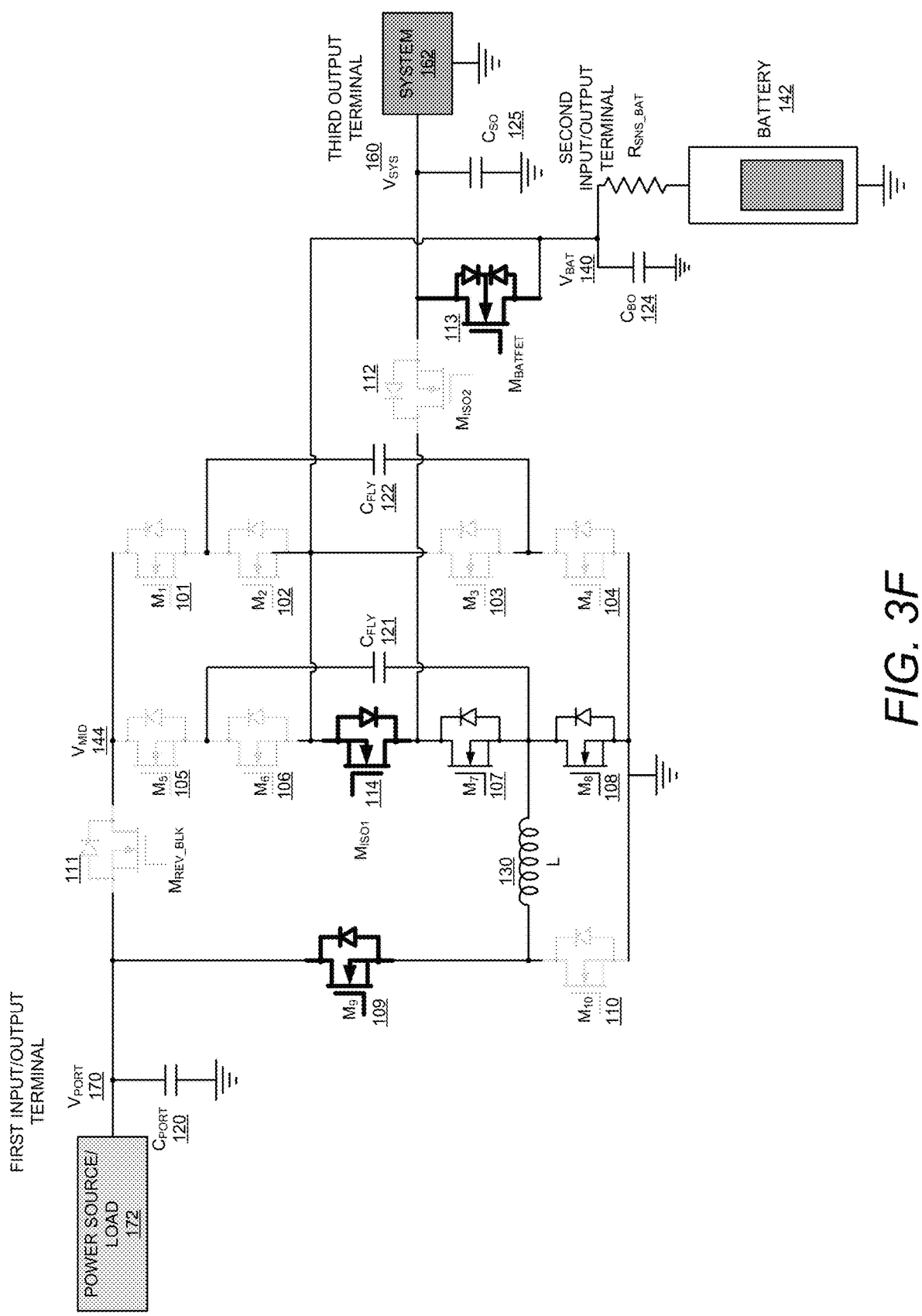
Figure 3G:
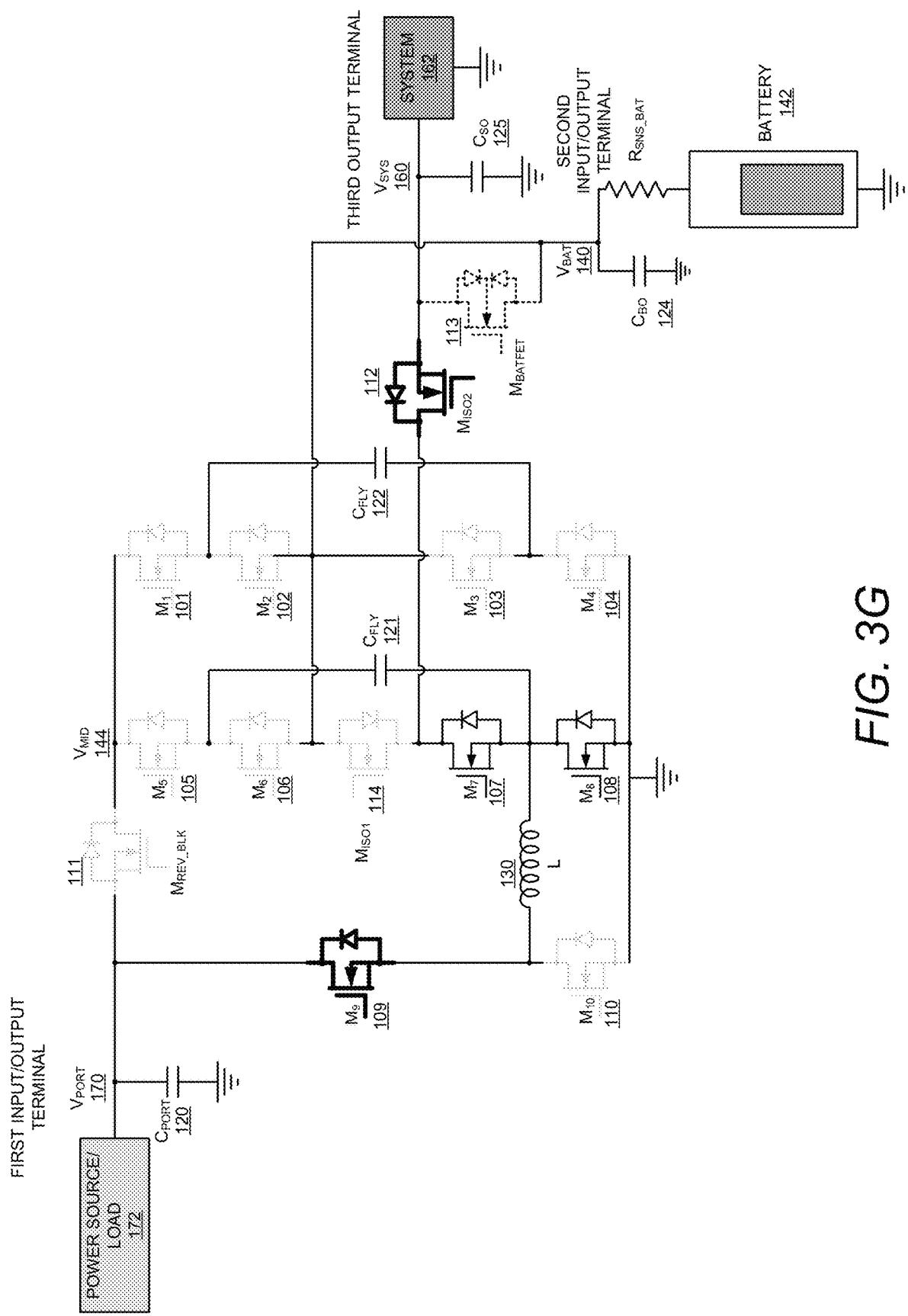

In an embodiment, a fifth converter network (interchangeably referred to as forward boost converter operation for providing power output to battery (142) from the input power source (172) at the first input terminal V$_{PORT}$ (170)) may be obtained, as shown in FIG. 3E, at the desired switching frequency by the method that may include the steps of turning on the ninth switch (109) during the entire operation, turning on the eighth switch (108) for an on-time duration, while keeping the seventh switch (107) switched off, and then turning on the seventh switch (107) for an off-time duration, while keeping the eighth switch (108) switch switched off. Both seventh switch (107) and eighth switch (108) are turned off for a pre-defined dead time while transition between turning on a switch and turning off another switch. In an embodiment, the total of on-time duration and off-time duration is equal to the switching cycle time-period, and the ratio of the total switching cycle time-period to the off-time duration (also represented in terms of the second duty cycle as 1/(1−D$_2$)) determines the ratio of voltage at the second output terminal V$_{BAT}$ (140) to the input supply voltage at the first input terminal V$_{PORT}$ (170). The reverse-blocking switch (111), the first switch (101), the second switch (102), the fifth switch (105), the sixth switch (106), the third switch (103), the tenth switch (110), and the fourth switch (104) may be switched off during the entire operation. The voltage relationships at the first input terminal $V_{PORT}$ (170) and the second output terminal $V_{BAT}$ (140) are as mentioned below (Assuming voltage drop in the power path due to switch resistance and other components is negligible):

$$\frac{V_{BAT(OUT)}}{V_{PORT(IN)}} = \frac{T_{ON\_M8} + T_{OFF\_M8}}{T_{OFF\_M8}} = \frac{1}{1 - D_2}$$

In an embodiment, a sixth converter network (interchangeably referred to as reverse buck converter operation for providing power output to a load (172) connected at the first output terminal $V_{PORT}$ (170) from battery (142) as a power source), as shown in FIG. 3E, may be obtained at the desired switching frequency by the method that may include the steps of turning on the ninth switch (109) during the entire operation, turning on the seventh switch (107) for an on-time duration, while keeping the eighth switch (108) switched off, and then turning on the eighth switch (108) for an off-time duration, while keeping the seventh switch (107) switched off. Both seventh switch (107) and eighth switch (108) are turned off for a pre-defined dead time while transition between turning on a switch and turning off another switch. In an embodiment, the total of on-time duration and off-time duration is equal to the switching cycle time-period, and the ratio of the on-time duration to the total switching cycle time-period (also referred to as the second duty cycle, $D_2$) may determine the ratio of output voltage at the first output terminal $V_{PORT}$ (170) to the input voltage at the second input terminal (140) connected to battery (142). The reverse-blocking switch (111), the first switch (101), the second switch (102), the fifth switch (105), the sixth switch (106), the third switch (103), the fourth switch (104) and the tenth switch (110) may be switched off during the entire operation. The voltage relationships at the first output terminal $V_{PORT}$ (170) and the second input terminal $V_{BAT}$ (140) are as mentioned below (Assuming voltage drop in the power path due to switch resistance and other components is negligible):

$$\frac{V_{PORT(OUT)}}{V_{BAT(IN)}} = \frac{T_{ON\_M7}}{T_{ON\_M7} + T_{OFF\_M7}} = \frac{T_{ON\_M7}}{T_{ON\_M7} + T_{ON\_M8}} = D_2$$

In an embodiment, a seventh converter network (interchangeably referred to as reverse boost converter operation for providing power output to a load (172) connected at the first output terminal $V_{PORT}$ (170) from battery (142) as a power source) may be obtained, as shown in FIG. 3C, at the desired switching frequency by the method that may include the steps of turning on the seventh switch (107) during the entire operation, turning on the tenth switch (110) for an on-time duration, while keeping the ninth switch (109) switched off, and then turning on the ninth switch (109) for an off-time duration, while keeping the tenth switch (110) switched off. Both ninth switch (109) and tenth switch (110) are turned off for a pre-defined dead time while transition between turning on a switch and turning off another switch. In an embodiment, the total of on-time duration and off-time duration is equal to the switching cycle time-period, and the ratio of the total switching cycle time-period to the off-time duration (also represented in terms of the first duty cycle $D_1$ as $1/(1-D_1)$) determines the ratio of output voltage at the first output terminal $V_{PORT}$ (170) to the input voltage at the second input terminal (140) connected to battery (142). The reverse-blocking switch (111), the first switch (101), the second switch (102), the fourth switch (104), the fifth switch (105), the sixth switch (106), the third switch (103) and the eighth switch (108) may be switched off during the entire operation. The voltage relationships at the first output terminal $V_{PORT}$ (170) and the second input terminal $V_{BAT}$ (140) are as mentioned below (assuming voltage drop in the power path due to switch resistance and other components is negligible):

$$\frac{V_{PORT(OUT)}}{V_{BAT(IN)}} = \frac{T_{ON\_M10} + T_{OFF\_M10}}{T_{OFF\_M10}} = \frac{1}{1 - D_1}$$

In an aspect, the hybrid power converter (100) as illustrated in FIG. 1 may be enhanced specifically for battery charging/discharging applications with accompanying portable device system as load to obtain the enhanced hybrid converter (200) as illustrated in FIG. 2 by including at least one additional third output terminal $V_{SYS}$ (160), consisting of an output capacitance $C_{SO}$ (125), where the third output terminal may be connected to the system load (162), and a battery disconnect switch (113) connected between the second input/output terminal $V_{BAT}$ (140) and the third output terminal $V_{SYS}$ (160). The battery (142) to be connected to the second output terminal $V_{BAT}$ (140) is in any or a combination of serial and parallel configuration of one or more connected cells, for example, 1S, 2S, and the like. The battery disconnect switch (113) when switched off, may isolate the battery (142) connected to the second terminal $V_{BAT}$ (140) from the system load (162) connected to the third output terminal $V_{SYS}$ (160).

In an embodiment, as shown in FIG. 2, a first isolation switch (114) may be added between the sixth switch (106) and seventh switch (107). A shared node of the first isolation switch (114) and the sixth switch (106) may be shorted to a shared node of the second switch (102) and the third switch (103), and connected to the second terminal $V_{BAT}$ (140) connected to the battery (142), and a shared node of the first isolation switch (114) and the seventh switch (107) may be connected to the third output terminal $V_{SYS}$ (160) connected to the system load (162) via a second isolation switch (112).

In an embodiment, the battery disconnect switch (113) may be added between the third output terminal $V_{SYS}$ (160) and the second input/output terminal $V_{BAT}$ (140). The battery disconnect switch (113), when switched off, may isolate the battery (142) connected to the second input/output terminal $V_{BAT}$ (140) from the system load (162) connected to the third output terminal $V_{SYS}$ (160).

In an embodiment, the first isolation switch (114), if implemented as n-channel power MOSFET, has the drain terminal connected towards the seventh switch (107), and the source terminal connected towards the sixth switch (106) and the second isolation switch (112), implemented as n-channel power MOSFET, has the drain terminal connected to a shared node of the first isolation switch (114) and the seventh switch (107), and the source terminal connected to the third output terminal $V_{SYS}$ (160). The battery disconnect switch (113), if implemented as n-channel power MOSFET, has drain terminal connected to the third output terminal $V_{SYS}$ (160) connected to the system load (162), and the source terminal connected to the second input/output terminal $V_{BAT}$ (140) connected to the battery (142).

In an embodiment, the switched capacitor converter operation for battery charging applications in portable devices may be obtained, at the desired switching frequency, as shown in FIG. 3B, by a method that may include the steps of turning on the reverse-blocking switch (111), the first isolation switch (114) and the battery disconnect switch (113) during the entire operation, turning on the first (101), third (103), sixth (106) and eighth (108) switches for a first half of the switching cycle, while keeping the second (102), fourth (104), fifth (105) and seventh (107) switches switched off, and then turning on the second (102), fourth (104), fifth (105) and seventh (107) switches for the second half of the switching cycle, while keeping the first (101), the third (103), the sixth (106) and the eighth (108) switches switched off.

In an embodiment, the first half and the second half of the switching cycles may have a small dead time between turning off a first set of switches and turning on a second set of switches and turning on a first set of switches and turning off a second set of switches. In an exemplary embodiment, a DC voltage generated at the second output terminal $V_{BAT}$ (140) is half of the input supply voltage at the first input terminal $V_{PORT}$ (170) and the average current drawn from the input power supply (172) is half of the total average current drawn by the load connected to the second output terminal $V_{BAT}$ (140) and third output terminal $V_{SYS}$ (160), i.e., the total of the average charging current drawn by the battery (142) and the load current drawn by the system (162). The second isolation switch (112), the ninth (109) switch and the tenth switch (110) may be switched off during the entire operation. The voltage and current relationships at the first input terminal $V_{PORT}$ (170), the second output terminal $V_{BAT}$ (140) and the third output terminal $V_{SYS}$ (160) are as mentioned below (Assuming voltage drop in the power path due to switch resistance and other components is negligible):

$$V_{BAT(OUT)} = \frac{V_{PORT(IN)}}{2},$$
$$V_{SYS(OUT)} = \frac{V_{PORT(IN)}}{2}$$
$$I_{PORT(IN)} = \frac{I_{BAT(OUT)} + I_{SYS(OUT)}}{2}$$

Figure 3H:
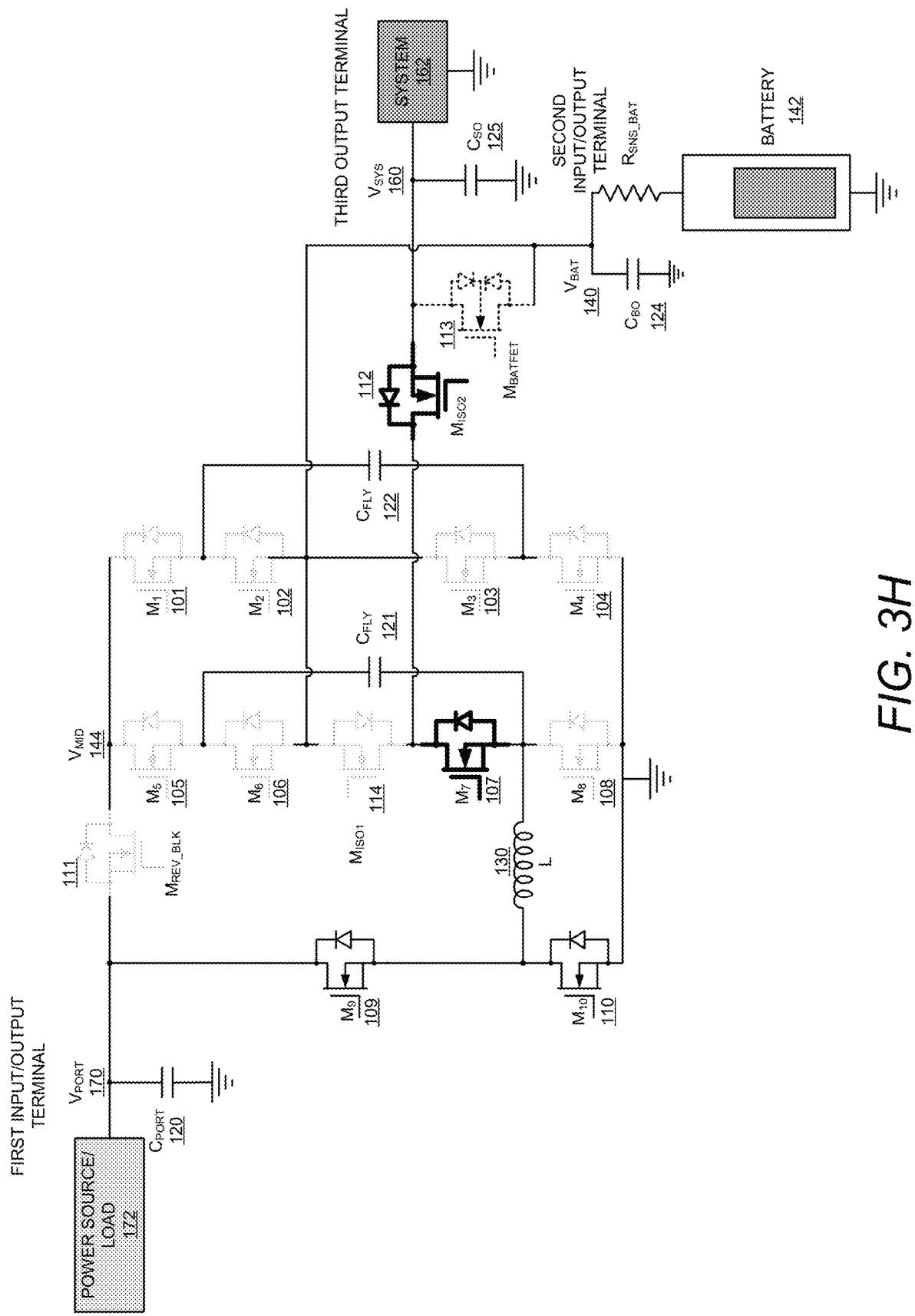
Figure 3I:
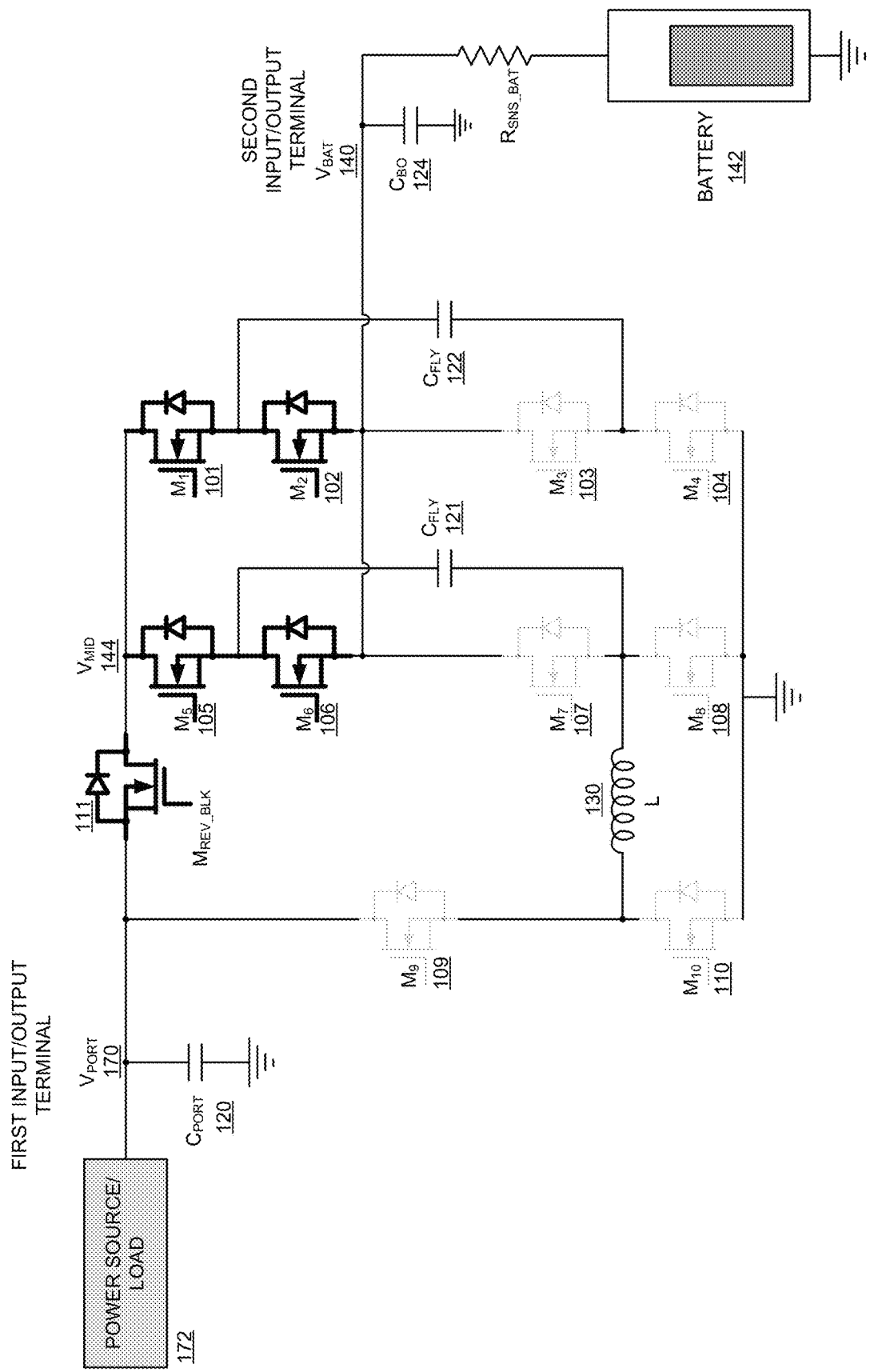
Figure 3J:
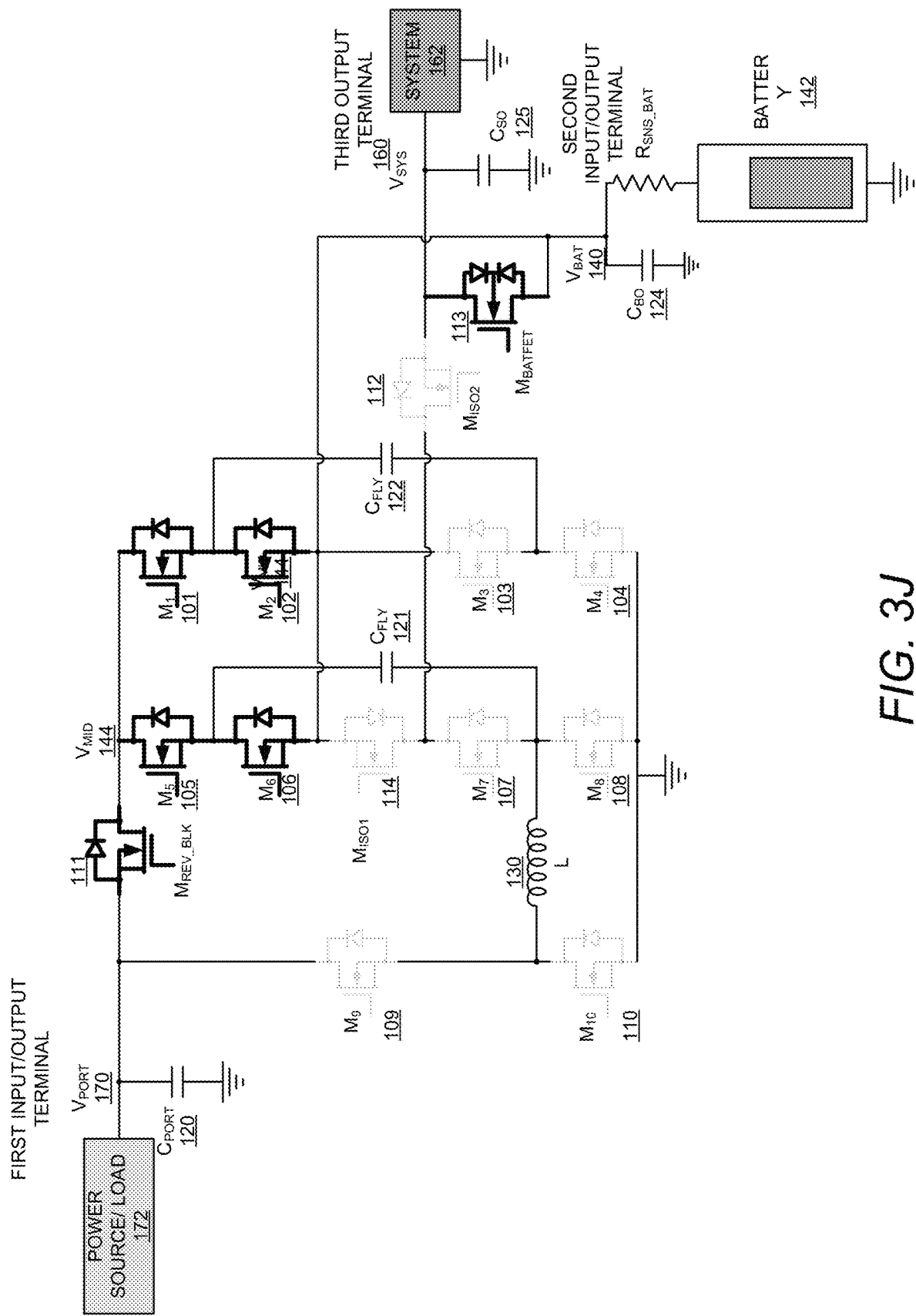

In an embodiment, the third converter network (interchangeably referred to as direct supply short operation) may be obtained, as shown in FIG. 3J, by the method that may include the steps of turning on the reverse-blocking switch (111), the battery disconnect switch (113), the first (101), the second (102), the fifth (105) and the sixth (106) switches during the entire operation, while keeping the third (103), the fourth (104), the seventh (107), the eighth (108), the ninth (109), the tenth (110) switches, the first isolation switch (114) and the second isolation switch (112) switched off during the entire operation. In an exemplary embodiment, a DC voltage generated at the second output terminal $V_{BAT}$ (140) connected to battery (142) is equal to the input supply voltage on the first input terminal $V_{PORT}$ (170) and the average current drawn from the input power supply (172) is equal to the total average current drawn by the load connected to the second output terminal $V_{BAT}$ (140) and the third output terminal $V_{SYS}$ (160), i.e., the total of the average charging current drawn by the battery (142) and the load current drawn by the system (162). The voltage and current relationships at the first input terminal $V_{PORT}$ (170), the second output terminal $V_{BAT}$ (140) and the third output terminal $V_{SYS}$ (160) are as mentioned below (Assuming voltage drop in the power path due to switch resistance and other components is negligible):

$$V_{BAT(OUT)} = V_{PORT(IN)}, V_{SYS(OUT)} = V_{PORT(IN)}, I_{PORT(IN)}$$
$$= I_{BAT(OUT)} + I_{SYS(OUT)}$$

In an embodiment, the fourth converter network (interchangeably referred to as the forward buck converter operation for providing power output primarily to battery (142) from the input power source (172) at the first input terminal $V_{PORT}$ (170)) that may be directed to battery may be obtained at the desired switching frequency, as shown in FIG. 3D, by the method that may include the steps of turning on the seventh switch (107), the first isolation switch (114) and the battery disconnect switch (113) during the entire operation, turning on the ninth switch (109) for an on-time duration, while keeping the tenth switch (110) switched off, and then turning on the tenth switch (110) for an off-time duration, while keeping the ninth switch (109) switched off. Both ninth switch (109) and tenth switch (110) are turned off for a pre-defined dead time while transition between turning on a switch and turning off another switch as like standard synchronous buck topology operation.

In an embodiment, the total of on-time duration and off-time duration is equal to the switching cycle time-period, and the ratio of on-time duration to the total switching cycle time-period (also represented as the first duty cycle, $D_1$) may determine the ratio of voltage at the second output terminal $V_{BAT}$ (140) to the input power supply voltage at the first input terminal $V_{PORT}$ (170). The reverse-blocking switch (111), the second isolation switch (112), the first (101), the second (102), the third (103) the fourth (104), the fifth (105), the sixth (106), and the eighth (108) switches may be switched off during the entire operation. The voltage relationships at the first input terminal $V_{PORT}$ (170), the second output terminal $V_{BAT}$ (140) and the third output terminal $V_{SYS}$ (160) are as mentioned below (assuming voltage drop in the power path due to switch resistance and other components is negligible):

$$\frac{V_{BAT(OUT)}}{V_{PORT(IN)}} = \frac{T_{ON\_M9}}{T_{ON\_M9} + T_{OFF\_M9}} = D_1,$$
$$V_{SYS(OUT)} = V_{BAT(OUT)}$$

Alternatively, the fourth converter network (interchangeably referred to as the forward buck converter operation for providing power output primarily to system load (162) from the input power source (172) at the first input terminal $V_{PORT}$ (170)) that may be directed to system may be obtained at the desired switching frequency, as shown in FIG. 3H, by the method that may include the steps of turning on the seventh switch (107) and the second isolation switch (112) during the entire operation, turning on (during CV battery charging phase) the battery disconnect switch (113) or turning off (after battery charging termination) the battery disconnect switch (113) or on-state resistance regulation (during battery trickle/pre-charge) of the battery disconnect switch (113) during the entire operation, turning on the ninth switch (109) for an on-time duration, while keeping the tenth switch (110) switched off, and then turning on the tenth switch (110) for an off-time duration, while keeping the ninth switch (109) switched off. Both ninth switch (109) and tenth switch (110) are turned off for a pre-defined dead time while transition between turning on a switch and turning off another switch as like standard synchronous buck topology operation.

In an embodiment, the total of on-time duration and off-time duration is equal to the switching cycle time-period, and the ratio of on-time duration to the total switching cycle time-period (also represented as the first duty cycle, $D_1$) may determine the ratio of voltage at the third output terminal $V_{SYS}$ (160) to the input power supply voltage at the first input terminal $V_{PORT}$ (170). The reverse-blocking switch (111), the first isolation switch (112), the first (101), the second (102), the third (103), the fourth (104), the fifth (105), the sixth (106), and the eighth (108) switches may be switched off during the entire operation. The voltage relationships at the first input terminal $V_{PORT}$ (170), the second output terminal $V_{BAT}$ (140) and the third output terminal $V_{SYS}$ (160) are as mentioned below (Assuming voltage drop in the power path due to switch resistance and other components is negligible):

$$\frac{V_{SYS(OUT)}}{V_{PORT(IN)}} = \frac{T_{ON\_M9}}{T_{ON\_M9} + T_{OFF\_M9}} = D_1,$$
$$V_{BAT(OUT)} \le V_{SYS(OUT)}$$

In an embodiment, the fifth converter network (interchangeably referred to as forward boost converter operation for providing power output primarily to battery (142) from the input power source (172) at the first input terminal $V_{PORT}$ (170)) that may be directed to battery may be obtained at the desired frequency, as shown in FIG. 3F, by the method that may include the steps of turning on the ninth switch (109), the battery disconnect switch (113) and the first isolation switch (114) during the entire operation, turning on the eighth switch (108) for an on-time duration, while keeping the seventh switch (107) switched off, and then turning on the seventh switch (107) for an off-time duration, while keeping the eighth switch (108) switched off. Both seventh switch (107) and eighth switch (108) are turned off for a pre-defined dead time while transition between turning on a switch and turning off another switch.

In an embodiment, the total of on-time duration and off-time duration is equal to the switching cycle time-period, and the ratio of the total switching cycle time-period to the off-time duration (also represented in terms of the second duty cycle $D_2$ as $1/(1-D_2)$) determines the ratio of voltage at the second output terminal $V_{BAT}$ (140) to the input supply voltage at the first input terminal $V_{PORT}$ (170). The reverse-blocking switch (111), the second isolation switch (112), the first switch (101), the second switch (102), the third switch (103), the fourth switch (104), the fifth switch (105), the sixth switch (106), and the tenth switch (110) may be switched off during the entire operation. The voltage relationships at the first input terminal $V_{PORT}$ (170), the second output terminal $V_{BAT}$ (140) and the third output terminal $V_{SYS}$ (160) are as mentioned below (assuming voltage drop in the power path due to switch resistance and other components is negligible):

$$\frac{V_{BAT(OUT)}}{V_{PORT(IN)}} = \frac{T_{ON\_M8} + T_{OFF\_M8}}{T_{OFF\_M8}} = \frac{1}{1 - D_2},$$
$$V_{SYS(OUT)} = V_{BAT(OUT)}$$

Alternatively, the fifth converter network (interchangeably referred to as forward boost converter operation for providing power output primarily to system load (162) from the input power source (172) at the first input terminal $V_{PORT}$ (170)) that may be directed to system may be obtained at the desired frequency, as shown in FIG. 3G, by the method that may include the steps of turning on the ninth switch (109), and the second isolation switch (112) during the entire operation, turning on (during CV battery charging phase) the battery disconnect switch (113) or turning off (after battery charging termination) the battery disconnect switch (113) or on-state resistance regulation (during battery trickle/pre-charge) of the battery disconnect switch (113) during the entire operation, turning on the eighth switch (108) for an on-time duration, while keeping the seventh switch (107) switched off, and then turning on the seventh switch (107) for an off-time duration, while keeping the eighth switch (108) switch switched off. Both seventh switch (107) and eighth switch (108) are turned off for a pre-defined dead time while transition between turning on a switch and turning off another switch.

In an embodiment, the total of on-time duration and off-time duration is equal to the switching cycle time-period, and the ratio of the total switching cycle time-period to the off-time duration (also represented in terms of the second duty cycle $D_2$ as $1/(1-D_2)$) determines the ratio of voltage at the third output terminal $V_{SYS}$ (160) to the input supply voltage at the first input terminal $V_{PORT}$ (170). The reverse-blocking switch (111), the first isolation switch (114), the first switch (101), the second switch (102), the third switch (103), the fourth switch (104), the fifth switch (105), the sixth switch (106), and the tenth switch (110) may be switched off during the entire operation. The voltage relationships at the first input terminal $V_{PORT}$ (170), the second output terminal $V_{BAT}$ (140) and the third output terminal $V_{SYS}$ (160) are as mentioned below (Assuming voltage drop in the power path due to switch resistance and other components is negligible):

$$\frac{V_{SYS(OUT)}}{V_{PORT(IN)}} = \frac{T_{ON\_M8} + T_{OFF\_M8}}{T_{OFF\_M8}} = \frac{1}{1 - D_2},$$
$$V_{BAT(OUT)} \le V_{SYS(OUT)}$$

In an embodiment, the sixth converter network (interchangeably referred to as reverse buck converter operation for providing power output to a load (172) connected at the first output terminal $V_{PORT}$ (170) from battery (142) as a power source) may be obtained at the desired switching frequency, as shown in FIG. 3F, by the method that may include the steps of turning on the ninth switch (109), battery disconnect switch (113) and the first isolation switch (114) during the entire operation, turning on the seventh switch (107) for an on-time duration, while keeping the eighth switch (108) switch switched off, and then turning on the eighth switch (108) switch for an off-time duration, while keeping the seventh switch (107) switched off. Both seventh switch (107) and eighth switch (108) are turned off for a pre-defined dead time while transition between turning on a switch and turning off another switch.

In an embodiment, the total of on-time duration and off-time duration is equal to the switching cycle time-period, and the ratio of the on-time duration to the total switching cycle time-period (also represented as the second duty cycle, $D_2$) may determine the ratio of the output voltage at the first output terminal $V_{PORT}$ (170) to the input voltage at the second input terminal $V_{BAT}$ (140) connected to battery (142). The reverse-blocking switch (111), the second isolation switch (112), the first switch (101), the second switch (102), the third switch (103), the fourth switch (104), the fifth switch (105), the sixth switch (106), and the tenth switch (110) may be switched off during the entire operation. The voltage relationships at the first output terminal $V_{PORT}$ (170), the second input terminal $V_{BAT}$ (140) and the third output terminal $V_{SYS}$ (160) are as mentioned below (assuming voltage drop in the power path due to switch resistance and other components is negligible):

$$\frac{V_{PORT(OUT)}}{V_{BAT(IN)}} = \frac{T_{ON\_M7}}{T_{ON\_M7} + T_{OFF\_M7}} = D_2,$$

$$V_{SYS(OUT)} = V_{BAT(IN)}$$

In an embodiment, the seventh converter network (interchangeably referred to as reverse boost converter operation for providing power output to a load (172) connected at the first output terminal $V_{PORT}$ (170) from battery (142) as a power source) may be obtained at the desired switching frequency, as shown in FIG. 3D, by the method that may include the steps of turning on the seventh switch (107), battery disconnect switch (113) and the first isolation switch (114) during the entire operation, turning on the tenth switch (110) for an on-time duration, while keeping the ninth switch (109) switched off, and then turning on the ninth switch (109) switch for an off-time duration, while keeping the tenth switch (110) switched off. Both ninth switch (109) and tenth switch (110) are turned off for a pre-defined dead time while transition between turning on a switch and turning off another switch.

In an embodiment, the total of on-time duration and off-time duration is equal to the switching cycle time-period, and the ratio of the total switching cycle time-period to the off-time duration (also represented in terms of the first duty cycle $D_1$ as $1/(1-D_1)$) determines the ratio of the output voltage at the first output terminal $V_{PORT}$ (170) to the input voltage at the second input terminal $V_{BAT}$ (140) connected to battery (142). The reverse-blocking switch (111), the second isolation switch (112), the first switch (101), the second switch (102), the third switch (103), the fourth switch (104), the fifth switch (105), the sixth switch (106), and the eighth switch (108) may be switched off during the entire operation. The voltage relationships at the first output terminal $V_{PORT}$ (170), the second input terminal $V_{BAT}$ (140) and the third output terminal $V_{SYS}$ (160) are as mentioned below (assuming voltage drop in the power path due to switch resistance and other components is negligible):

$$\frac{V_{PORT(OUT)}}{V_{BAT(IN)}} = \frac{T_{ON\_M10} + T_{OFF\_M10}}{T_{OFF\_M10}} = \frac{1}{1-D_1},$$

$$V_{SYS(OUT)} = V_{BAT(IN)}$$

In an embodiment, the plurality of operation of the hybrid power converter for battery charging phases for charging a battery (142) connected to the second output terminal $V_{BAT}$ (140) with a first input power supply (172) connected to the first input terminal $V_{PORT}$ (170) may be with predetermined specifications. The first input supply can be defined as a legacy 5V USB Type-C/USB Type-A power adapter with/without captive charging USB cable, or a USB Type-C power adapter with/without captive charging USB cable with USB power delivery (PD) protocol support with only fixed and/or variable supplies or any other fast-charging protocol support with voltage(s) higher than 5V but not limited to it. The operation of the hybrid power converter, connected to the first input supply, can be defined as a forward buck operation (for 1S battery) or forward boost operation (for 2S battery) during trickle and pre-charging phases of the battery charging, while regulating a constant voltage at the third output terminal $V_{SYS}$ (160) connected to the system load (162), where the resistance of the battery disconnect switch (113) is controlled to regulate a specified trickle and pre-charge current into the second output terminal $V_{BAT}$ (140) connected to battery (142).

Additionally, the operation of power converter, connected to the first input supply, for constant-current (CC) battery charging phase, can be defined as forward buck operation (for 1S battery) or forward boost operation (for 2S battery), while regulating forward buck/forward boost operation to obtain a constant current drawn at the second output terminal $V_{BAT}$(140), wherein the constant current value is decided based on the battery design capacity and the maximum current supported by the input supply.

Additionally, the operation of power converter, connected to the first input supply, for constant-voltage (CV) battery charging phase, can be defined as forward buck operation (for 1S battery) or forward boost operation (for 2S battery), while regulating forward buck/forward boost operation to obtain a constant voltage at the second output terminal $V_{BAT}$ (140) connected to battery (142).

In an embodiment, the operation of hybrid power converter for battery charging phases for a second input power supply with predetermined specifications that may include a USB Type-C power adapter with USB power delivery (PD) programmable power supply (PPS) protocol support or any USB Type-C/Type-A power adapter with fast charging protocol support having programmable voltage levels and one or more current limit modes but not limited to it, and can be defined as forward buck operation or forward boost operation during trickle and pre-charging phases of the battery charging, while regulating forward buck/forward boost operation to obtain a constant voltage at the third output terminal $V_{SYS}$ (160) connected to system load (162), where the resistance of the battery disconnect switch (113) is controlled to regulate a specified trickle and pre-charge current into the second output terminal $V_{BAT}$ (140) connected to battery (142).

Additionally the operation of power converter, connected to the second input supply, for constant-current (CC) battery charging phase can be defined as switched capacitor converter operation, while negotiating an input supply voltage to be of second input supply type and input voltage level at $V_{PORT}$ (170) approximately twice of the voltage at the second output terminal $V_{BAT}$ (140), wherein the total of the average current drawn by the second output terminal $V_{BAT}$ (140) and the third output terminal $V_{SYS}$ (160) is twice of the average current drawn from the input supply. In an exemplary embodiment with USB-PD PPS power adapter, the input voltage level is set to slightly above twice of the battery (142) voltage connected to the second output terminal $V_{BAT}$ (140) and input current limit set to half of the pre-defined constant charging current, wherein the total average current flowing into the battery (142) and the system (162) is twice of the average current drawn from the second input supply and the input voltage is periodically increased via power negotiation to ensure that the second input supply remains in current limit mode during CC charging phase.

Additionally, the operation of power converter, connected to the second input supply, for constant-voltage (CV) battery charging phase can be defined as forward buck operation, while regulating a constant voltage at the second output terminal $V_{BAT}$ (140).

Alternatively, the operation of power converter for CC battery charging phase, using a second input power supply, can be defined as direct supply short operation, while negotiating an input supply voltage to be of second input power supply type and input voltage level at $V_{PORT}$ (170) approximately same as the voltage at the second output terminal $V_{BAT}$ (140), wherein the total of the average current drawn by the second output terminal $V_{BAT}$ (140) and the third output terminal $V_{SYS}$ (160) is equal to the average current drawn from the input supply. In an exemplary embodiment with USB-PD PPS power adapter, input voltage level is set to slightly above the battery (142) voltage level connected to second output terminal $V_{BAT}$ (140) and input current limit set to the pre-defined constant charging current, wherein the total average current flowing into the battery (142) and the system (162) is the same as the average input current and the input voltage is periodically increased via power negotiation to ensure that the second input supply remains in current limit mode during CC charging phase.

FIGS. 3A-3J illustrate exemplary schematic diagram of the proposed hybrid power converter for a plurality of operations, in accordance with an embodiment of the present disclosure.

FIG. 3A illustrates a first converter network which may be the switched capacitor operation in hybrid power converter for only battery charging. As illustrated, the ninth (109) and the tenth (110) switches are always off, the reverse-blocking switch (111) is always on and the rest of the switches keep switching. FIG. 3B illustrates a switched capacitor operation in hybrid power converter for battery charging application with parallel system load to the battery, where, as illustrated, the ninth (109), the tenth (110) switches, and the second isolation switch (112) are always off, the reverse blocking switch (111), the battery disconnect switch (113) and the first isolation switch (114) are always on and the rest of the switches keep switching. FIG. 3C illustrates forward buck (fourth converter network) and reverse boost (seventh converter network) in hybrid power converter for only battery charging/discharging, and as illustrated, the seventh switch (107) is always on, the reverse-blocking switch (111), the first switch (101), the second switch (102), the third switch (103), the fourth switch (104), the fifth switch (105), the sixth switch (106) and the eighth switch (108) are always off and the rest of the switches keep switching. FIG. 3D illustrates forward buck (fourth converter network) and reverse boost (seventh converter network) in hybrid power converter for battery charging/discharging application with parallel system load to the battery, as illustrated, the reverse-blocking switch (111), the first switch (101), the second switch (102), the third switch (103), the fourth switch (104), the fifth switch (105), the sixth switch (106), the eighth switch (108), the second isolation switch (112) are always off, the seventh switch (107) and the first isolation switch (114) are always on and the rest of the switches keep switching. FIG. 3E illustrates reverse buck (sixth converter network) and forward boost (fifth converter network) in hybrid power converter for only battery charging/discharging applications and as illustrated, the ninth switch (109) is always on, the first switch (101), the second switch (102), the third switch (103), the fourth switch (104), the fifth switch (105), the sixth switch (106), the tenth switch (110), the reverse-blocking switch (111), are always off, the seventh switch (107) and the eighth switch (108) keep switching. FIG. 3F illustrates reverse buck (sixth converter network) and forward boost (fifth converter network) in hybrid power converter for battery charging/discharging applications with parallel system load to the battery, as illustrated, the first switch (101), the second switch (102), the third switch (103), the fourth switch (104), the fifth switch (105), the sixth switch (106), the tenth switch (110), the reverse-blocking switch (111), the second isolation switch (112) are always off, the ninth switch (109), the battery disconnect switch (113) and the first isolation switch (114) are always on and the rest of the switches keep switching. FIG. 3G illustrates controlling BATFET for trickle/pre-charge battery charging phase when running directed-to-system forward boost operation in Hybrid Power Converter and as illustrated, the ninth switch (109), the second isolation switch (112) are always on, the first switch (101), the second switch (102), the third switch (103), the fourth switch (104), the fifth switch (105), the sixth switch (106), the tenth switch (110), the reverse-blocking switch (111) and the first isolation switch (114) are always off and the rest of the switches keep switching while the battery disconnect switch (113) is regulated for constant current by adjusting internal resistance of the switch. FIG. 3H illustrates controlling BATFET for trickle/pre-charge battery charging phase when running directed-to-system forward buck operation in Hybrid Power Converter and as illustrated, the seventh switch (107), the second isolation switch (112) are always on, the first switch (101), the second switch (102), the third switch (103), the fourth switch (104), the fifth switch (105), the sixth switch (106), the eighth switch (108), the reverse-blocking switch (111) and the first isolation switch (114) are always off and the rest of the switches keep switching while the battery disconnect switch (113) is regulated for constant current by adjusting internal resistance of the switch.

FIG. 3I illustrates a direct supply short operation (third converter network) in hybrid power converter for only battery charging/discharging and as illustrated, the first switch (101), the second switch (102), the fifth switch (105) and the sixth switch (106) and the reverse-blocking switch (111) are always on, the third switch (103), the fourth switch (104), the seventh switch (107), the eighth switch (108) the ninth switch (109) and the tenth switch (110) are always off. FIG. 3J illustrates a direct supply short operation (third converter network) in hybrid power converter for battery charging/discharging and portable device system as load and as illustrated, the first switch (101), the second switch (102), the fifth switch (105) and the sixth switch (106), battery disconnect switch (113) and the reverse-blocking switch (111) are always on, while the third switch (103), the fourth switch (104), the seventh switch (107), the eighth switch (108), the first isolation switch (114) and the second isolation switch (112) the ninth switch (109) and the tenth switch (110) are always off.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present disclosure provides for a single hybrid power converter topology for battery charging, battery discharging in reverse direction, providing system supply.

The present disclosure provides for a single hybrid power converter topology that supports multiple operation modes by using optimal number of switches by re-use of switches across operational modes: switched capacitor, direct supply short, forward buck, reverse buck, forward boost, reverse boost and the like.

The present disclosure provides for a single hybrid power converter topology that facilitates appropriate mode selection for all battery charging phases such as Trickle, pre-charge, CC, CV and the like and battery discharging.

The present disclosure provides for a single hybrid power converter topology that is scalable for any battery cell configuration such as 1S,2S, and the like.

The present disclosure provides for a single hybrid power converter topology that supports input supply as all varieties of power adapters such as legacy, USB PD, BC1.2, proprietary fast charging protocols, and the like for battery charging.

What is claimed is:

1. A hybrid power converter facilitating bidirectional power conversion, comprising: an input terminal comprising one or more capacitors, and is connected to an input power supply; one or more output terminals, each of the one or more output terminals connected to one or more output capacitors and an output load; a first converter network with interleaved phases, the first converter network comprising at least eight switches, wherein a first switch and a fifth switch are connected on a fourth terminal electrically coupled to a first input/output terminal through a reverse-blocking switch for blocking current, when required, from a second input/output terminal connected to battery as power source towards the first input/output terminal connected to a load, wherein a first set of parallel flying capacitors are connected across a shared node of the first switch and a second switch and a shared node of a third switch and a fourth switch, wherein a second set of parallel flying capacitors are connected across a shared node of the fifth switch and a sixth switch and a shared node of a seventh switch and an eighth switch, and wherein a shared node of the second switch and the third switch and a shared node of the sixth switch and the seventh switch are connected to a second input/output terminal connected to the battery;
a second converter network comprising at least four switches, wherein a series combination of a ninth switch and a tenth switch are connected from the first input/output terminal to a ground, and a shared node of the ninth switch and the tenth switch is connected via an inductor to a shared node of the seventh switch and the eighth switch, wherein the second set of parallel flying capacitors are connected to the inductor at the shared node of the seventh switch and the eighth switch,
wherein the second converter network comprises of four sub-networks, a fourth converter network, a fifth converter network, a sixth converter network and a seventh converter network, wherein reconfiguring any or a combination of the first converter network and the second converter network by switching or turning on plurality of switches facilitates a plurality of power converter networks.

2. The hybrid power converter as claimed in claim 1, wherein the input power supply and the output load are operated based on a direction of a power conversion flow, wherein the first input/output terminal is connected to the input power supply or the output load based on an operational mode and application, wherein the battery to be connected to the second input/output terminal is any or a combination of serial and parallel configuration of one or more connected cells and, wherein the battery is operated in a charging mode acting as the load or a discharging mode acting as the power source.

3. A hybrid power converter as claimed in claim 1, wherein the hybrid power converter further comprises: at least a third output terminal, connected to an output capacitance, and to a system load and a battery disconnect switch connected between the third output terminal and the second input/output terminal, wherein the battery disconnect switch, when switched off, isolates the battery connected to the second input/output terminal from the system load connected to the third output terminal, wherein a first isolation switch is added between the sixth and seventh switch, wherein a shared node of the first isolation switch and the sixth switch is shorted to a shared node of the second and third switch, and connected to the second input/output terminal connected to the battery, wherein a shared node of the first isolation switch and the seventh switch is connected to the third output terminal connected to the system load via a second isolation switch.

4. A hybrid power converter as claimed in claim 1, wherein the first converter network further comprises:
a second terminal of the first switch connected to a series combination of the second switch, the third switch and the fourth switch;
a second terminal of the fourth switch connected to the ground;
a second terminal of the fifth switch connected to a series combination of the sixth switch, the seventh switch and the eighth switch, wherein a second terminal of the eight switch is connected to the ground;
a shared node of the second switch and the third switch is shorted to a shared node of the sixth switch and the seventh switch.

5. The hybrid power converter as claimed in claim 1, wherein the one or more switches are physically implemented as n-channel power MOSFETs, wherein each drain terminal of the first switch to the tenth switch are connected in a direction of the first input/output terminal and each source terminal of the first to the tenth switches are connected in the direction of the ground, and wherein the first to the tenth switches are capable of switching operation over a frequency range.

6. The hybrid power converter as claimed in claim 1, wherein the hybrid power converter further comprises: a first isolation switch implemented as n-channel power MOSFET, the first isolation switch implemented as n-channel power MOSFET has a drain terminal connected to the seventh switch, and a source terminal connected to the sixth switch; a second isolation switch implemented as n-channel power MOSFET, the second isolation switch implemented as n-channel power MOSFET has a drain terminal connected to a shared node of the first isolation switch and the seventh switch, and a source terminal connected to the third output terminal connected to a system load; a battery disconnect switch implemented as n-channel power MOSFET, the battery disconnect switch implemented as a true reverse current blocking MOSFET and has a drain terminal connected to a third output terminal connected to the system load, a source terminal connected to the second input/output terminal connected to the battery, and a bulk terminal connected to the drain or the source terminal depending on a direction of a reverse current flow.

7. The hybrid power converter as claimed in claim 1, wherein an output node of the second converter network towards the second input/output terminal connected to the battery is the same as the output node of the first converter network.

8. A method of power conversion at a predefined switching frequency, comprising: turning on a reverse-blocking switch of a hybrid power converter facilitating bidirectional power conversion during an operation, wherein the hybrid power converter an input terminal comprising one or more capacitors, and is connected to an input power supply;

one or more output terminals, each of the one or more output terminals connected to one or more output capacitors and an output load; a first converter network with interleaved phases, the first converter network comprising at least eight switches, wherein a first switch and a fifth switch are connected on a fourth terminal electrically coupled to a first input/output terminal through the reverse-blocking switch for blocking current, when required, from a second input/output terminal connected to battery as power source towards the first input/output terminal connected to a load, wherein a first set of parallel flying capacitors are connected across a shared node of the first switch and a second switch and a shared node of a third switch and a fourth switch, wherein a second set of parallel flying capacitors are connected across a shared node of the fifth switch and a sixth switch and a shared node of a seventh switch and an eighth switch, and wherein a shared node of the second switch and the third switch and a shared node of the sixth switch and the seventh switch are connected to the second input/output terminal connected to the battery;

a second converter network comprising at least four switches, wherein a series combination of a ninth switch and a tenth switch are connected from the first input/output terminal to a ground, and a shared node of the ninth switch and the tenth switch is connected via an inductor to a shared node of the seventh switch and the eighth switch, wherein the second set of parallel flying capacitors are connected to the inductor at the shared node of the seventh switch and the eighth switch, wherein the second converter network comprises of four sub-networks, a fourth converter network, a fifth converter network, a sixth converter network and a seventh converter network, wherein reconfiguring any or a combination of the first converter network and the second converter network by switching or turning on plurality of switches facilitates a plurality of power converter networks; keeping off the ninth and the tenth switch during the operation; turning on a first set of switches comprising the first switch, the third switch, the sixth switch, and the eighth switch for a first half of a switching cycle, while keeping a second set of switches comprising the second switch, the fourth switch, the fifth switch and the seventh switch switched off; and turning on the second set of switches for a second half of the switching cycle, while keeping the first set of switches off, wherein a dead time interval is maintained between turning-off of one set of switches and turning-on of another set of switches.

9. The method as claimed in claim 8, wherein the method further comprises: turning on the ninth switch for obtaining a sixth converter network or turning on the seventh switch for obtaining a seventh converter network during the operation; turning on the seventh switch for obtaining the sixth converter network or turning on the tenth switch for obtaining the seventh converter network for an on-time duration, while keeping the eighth switch of the sixth converter network or the ninth switch of the seventh converter network switched off, and turning on the eighth switch of the sixth converter network or turning on the ninth switch of the seventh converter network for an off-time duration, while keeping the seventh switch of the sixth converter network or the tenth switch of the seventh converter network switched off, and wherein the dead time interval is maintained between turning-off of one set of switches and turning-on of another set of switches, and wherein the reverse-blocking switch, the first, the second, the fifth, the sixth, the third, and the fourth switch for both the sixth and the seventh converter network, the eighth switch for the seventh converter network and the tenth switch for the sixth converter network are switched off during the operation.

10. The method as claimed in claim 8, wherein the method further comprises: turning on of a first isolation switch and a battery disconnect switch and turning off of a second isolation switch for any of the first converter network, a fourth converter network, a fifth converter network, for power conversion with output associated to the second input/output terminal connected to a battery, and any of a sixth converter network and a seventh converter network for power conversion with output associated with a first output terminal.

11. The method as claimed in claim 8, wherein the method further comprises turning on of a second isolation switch and a battery disconnect switch and turning off of a first isolation switch for any of the fourth converter network and the fifth converter network comprises power conversion with output associated to a third output terminal connected to a system load.

12. The method as claimed in claim 8, wherein the method of power conversion at a predefined switching frequency further comprises: turning on the reverse-blocking switch, the first, the second, the fifth and the sixth switches during an entire operation; and keeping the third, the fourth, the seventh, the eighth, the ninth and the tenth switch switched off during the entire operation to obtain a third converter network.

13. The method as claimed in claim 8, wherein the method of power conversion at a predefined switching frequency further comprises: turning on the seventh switch for obtaining the fourth converter network or turning on the ninth switch for obtaining the fifth converter network during the entire operation; turning on the ninth switch for obtaining the fourth converter network or turning on the eighth switch for obtaining the fifth converter network for an on-time duration, while keeping the tenth switch of the fourth converter network or the seventh switch of the fifth converter network switched off, and turning on the tenth switch of the fourth converter network or turning on the seventh switch of the fifth converter network for an off-time duration, while keeping the ninth switch of the fourth converter network or the eighth switch of the fifth converter network switched off, and wherein the dead time interval is maintained between the turning-off of one set of switches and turning-on of another set of switches, and wherein the reverse-blocking switch, the first, the second, the fifth, the sixth, the third, and the fourth switch for both the fourth and the fifth converter network, the eighth switch for the fourth converter network and the tenth switch for the fifth converter network are switched off during an entire operation.

14. The method as claimed in claim 8, wherein the method for power conversion during battery charging phases for charging battery connected to the second input/output terminal with a first input supply connected to the first input/ output terminal with predetermined specifications further comprises: operating any of the fourth converter network or the fifth converter network during trickle and pre-charging phases for a pre-defined trickle or pre-charge time, while regulating a constant output voltage at a third output terminal connected to a system load, wherein a resistance of a battery disconnect switch is controlled to regulate a specified trickle and pre-charge current into the second input/output terminal connected to the battery, operating any of the fourth converter network or converter network during constant current charge (CC) phase, while regulating a constant current drawn at the second input/output terminal connected to the battery, wherein a constant current value is decided based on a battery design capacity, chemistry and temperature, maximum current supported by the first input/output terminal connected to the power source and the maximum current supported by power converter switches; and operating any of the fourth converter network or the fifth converter network during constant voltage (CV) phase, while regulating a constant output voltage at the second input/output terminal connected to battery.

15. The method as claimed in claim 14, wherein the method for charging the battery connected to the second input/output terminal with a second input supply connected to the first input/output terminal and predetermined specifications further comprises any of: operating the first converter network during constant current charge (CC) phase, while negotiating the second input supply and ensuring the second input supply operates in a current limited mode with an average input current half of a total of a constant charging current and/or system load; or alternatively, operating third converter network during constant current (CC) charge phase, while negotiating the second input supply and ensuring the second input supply operates in a current limited mode with the average input current equal to the total of the constant charging current and/or system load.

\* \* \* \* \*